(12) United States Patent
David et al.

(10) Patent No.: US 12,124,731 B2
(45) Date of Patent: Oct. 22, 2024

(54) MAINTAINING SMOOTH METADATA LOG DESTAGING AND BURST TOLERANCE

(71) Applicant: Dell Products L.P., Round Rock, TX (US)

(72) Inventors: Bar David, Rishon Lezion (IL); Vladimir Shveidel, Pardes-Hana (IL)

(73) Assignee: Dell Products L.P., Round Rock, TX (US)

( * ) Notice: Subject to any disclaimer, the term of this patent is extended or adjusted under 35 U.S.C. 154(b) by 155 days.

(21) Appl. No.: 17/872,234

(22) Filed: Jul. 25, 2022

(65) Prior Publication Data

US 2024/0028251 A1 Jan. 25, 2024

(51) Int. Cl.
*G06F 3/06* (2006.01)
(52) U.S. Cl.
CPC .......... *G06F 3/0655* (2013.01); *G06F 3/0604* (2013.01); *G06F 3/0644* (2013.01); *G06F 3/0679* (2013.01)
(58) Field of Classification Search
CPC .... G06F 3/0655; G06F 3/0656; G06F 3/0644; G06F 3/0679; G06F 3/0613; G06F 3/0646; G06F 3/0689; G06F 3/067; G06F 3/0604
See application file for complete search history.

(56) References Cited

U.S. PATENT DOCUMENTS

| | | | |
|---|---|---|---|
| 9,135,181 B2 | 9/2015 | Eleftheriou et al. | |
| 10,437,670 B1 | 10/2019 | Koltsidas et al. | |
| 11,200,219 B2 | 12/2021 | Shveidel et al. | |
| 2011/0307447 A1 | 12/2011 | Sabaa et al. | |
| 2013/0054928 A1* | 2/2013 | Im | G06F 12/0246 711/170 |
| 2013/0227201 A1* | 8/2013 | Talagala | G06F 13/28 711/103 |
| 2014/0089264 A1 | 3/2014 | Talagala et al. | |
| 2015/0237127 A1 | 8/2015 | Khemani | |
| 2016/0098295 A1* | 4/2016 | Ash | G06F 12/0875 718/106 |
| 2017/0212690 A1* | 7/2017 | Babu | G06F 3/0685 |
| 2017/0371912 A1 | 12/2017 | Kimura | |
| 2018/0137187 A1 | 5/2018 | Brodt et al. | |
| 2019/0042464 A1* | 2/2019 | Genshaft | G06F 12/0864 |
| 2020/0241793 A1* | 7/2020 | Shveidel | G06F 3/0604 |

(Continued)

*Primary Examiner* — Khoa D Doan
*Assistant Examiner* — Julian S Mendel
(74) *Attorney, Agent, or Firm* — BainwoodHuang

(57) ABSTRACT

A technique is directed to processing metadata changes. The technique involves designating a first tablet to ingest metadata changes and a second tablet to destage previously ingested metadata changes, the first tablet being partitioned into a first reserved space and a first regular space that form a first memory pool, and the second tablet being partitioned into a second reserved space and a second regular space that form a second memory pool. The technique further involves, while the first tablet is designated to ingest metadata changes and the second tablet is designated to destage previously ingested metadata changes, ingesting metadata changes into the first tablet and destaging the previously ingested metadata changes from the second tablet. The technique further involves, when the first tablet becomes full, performing a switch operation that designates the second tablet to ingest metadata changes and the first tablet to destage previously ingested metadata changes.

20 Claims, 14 Drawing Sheets

(56) References Cited

U.S. PATENT DOCUMENTS

| | | | |
|---|---|---|---|
| 2021/0034674 A1* | 2/2021 | Palsetia | G06F 16/9017 |
| 2021/0124726 A1* | 4/2021 | Shveidel | G06F 16/2255 |
| 2023/0289061 A1* | 9/2023 | Stoica | G06F 3/0679 |
| 2023/0350810 A1* | 11/2023 | Thoppil | G06F 12/1018 |

* cited by examiner

MAINTAINING SMOOTH METADATA LOG DESTAGING AND BURST TOLERANCE

BACKGROUND

Storing and safeguarding electronic content may be beneficial in modern business and elsewhere. Accordingly, various methodologies may be employed to protect and distribute such electronic content. For example, changes to data and metadata of a storage system may be stored in journals and/or logs in memory before writing the changes to a storage array.

Conventional storage systems may apply various input/output (IO) schemes to improve write performance. For example, data and metadata from an IO write operation may be initially stored in a journal, to provide a quick acknowledgment signal to a client computing device, and subsequently stored in a persistent storage of a storage array. However, journals may be generated in a non-volatile memory which may be an expensive resource with limited space for storing data and metadata. For example, in conventional storage systems, these journals may be unable to accommodate more than a few seconds of IO traffic.

SUMMARY

In one example implementation, a computer-implemented method executed on a computing device may include but is not limited to associating each data container of a first set of data containers in volatile memory with a metadata page. One or more metadata changes associated with a metadata page may be written to the data container associated with the metadata page. The one or more metadata changes stored in the first set of data containers may be written to a storage array.

One or more of the following example features may be included. Writing the one or more metadata changes to the first set of data containers may include writing metadata changes to the first set of data containers until at least one data container of the first set of data container is full. The first set of data containers may be switched with a second set of data containers when the at least one data container of the first set of data container is full. One or more subsequent metadata changes may be written to the second set of data containers. Associating each data container of the set of data containers with a metadata page may be based upon, at least in part, a hash function of an index of the metadata page. A target data container for writing the one or more metadata changes may be determined based upon, at least in part, a hash function of an index of the metadata page associated with the one or more metadata changes. A read request may be received for a metadata page stored in the storage array. The data container from the first set of data containers in the volatile memory that is associated with the metadata page of the read request may be identified. One or more metadata changes from the identified data container may be identified. The metadata page may be read from the storage array. The one or more identified metadata changes may be merged with the metadata page read from the storage array, thus defining a current metadata page. The current metadata page may be provided in response to the read request. Writing the one or more metadata changes stored in the first set of data containers to the storage array may include writing the one or more metadata changes stored in each data container to a separate data container page of a set of data container pages in the storage array, wherein each data container page is associated with a metadata page. A plurality of data container pages associated with a metadata page from a plurality of sets of data container pages in the storage array may be combined, thus defining a data container working set. The metadata page may be read from the storage array. The one or more metadata changes from the data container working set and the metadata page read from the storage array may be merged, thus defining an updated metadata page. The updated metadata page may be written to the storage array.

In another example implementation, a computer program product resides on a computer readable medium that has a plurality of instructions stored on it. When executed by a processor, the instructions cause the processor to perform operations that may include but are not limited to associating each data container of a first set of data containers in volatile memory with a metadata page. One or more metadata changes associated with a metadata page may be written to the data container associated with the metadata page. The one or more metadata changes stored in the first set of data containers may be written to a storage array.

One or more of the following example features may be included. Writing the one or more metadata changes to the first set of data containers may include writing metadata changes to the first set of data containers until at least one data container of the first set of data container is full. The first set of data containers may be switched with a second set of data containers when the at least one data container of the first set of data container is full. One or more subsequent metadata changes may be written to the second set of data containers. Associating each data container of the set of data containers with a metadata page may be based upon, at least in part, a hash function of an index of the metadata page. A target data container for writing the one or more metadata changes may be determined based upon, at least in part, a hash function of an index of the metadata page associated with the one or more metadata changes. A read request may be received for a metadata page stored in the storage array. The data container from the first set of data containers in the volatile memory that is associated with the metadata page of the read request may be identified. One or more metadata changes from the identified data container may be identified. The metadata page may be read from the storage array. The one or more identified metadata changes may be merged with the metadata page read from the storage array, thus defining a current metadata page. The current metadata page may be provided in response to the read request. Writing the one or more metadata changes stored in the first set of data containers to the storage array may include writing the one or more metadata changes stored in each data container to a separate data container page of a set of data container pages in the storage array, wherein each data container page is associated with a metadata page. A plurality of data container pages associated with a metadata page from a plurality of sets of data container pages in the storage array may be combined, thus defining a data container working set. The metadata page may be read from the storage array. The one or more metadata changes from the data container working set and the metadata page read from the storage array may be merged, thus defining an updated metadata page. The updated metadata page may be written to the storage array.

In another example implementation, a computing system includes at least one processor and at least one memory architecture coupled with the at least one processor, wherein the computing system is configured to perform operations that may include but are not limited to associating each data container of a first set of data containers in volatile memory with a metadata page. One or more metadata changes associated with a metadata page may be written to the data container associated with the metadata page. The one or more metadata changes stored in the first set of data containers may be written to a storage array.

One or more of the following example features may be included. Writing the one or more metadata changes to the first set of data containers may include writing metadata changes to the first set of data containers until at least one data container of the first set of data container is full. The first set of data containers may be switched with a second set of data containers when the at least one data container of the first set of data container is full. One or more subsequent metadata changes may be written to the second set of data containers. Associating each data container of the set of data containers with a metadata page may be based upon, at least in part, a hash function of an index of the metadata page. A target data container for writing the one or more metadata changes may be determined based upon, at least in part, a hash function of an index of the metadata page associated with the one or more metadata changes. A read request may be received for a metadata page stored in the storage array. The data container from the first set of data containers in the volatile memory that is associated with the metadata page of the read request may be identified. One or more metadata changes from the identified data container may be identified. The metadata page may be read from the storage array. The one or more identified metadata changes may be merged with the metadata page read from the storage array, thus defining a current metadata page. The current metadata page may be provided in response to the read request. Writing the one or more metadata changes stored in the first set of data containers to the storage array may include writing the one or more metadata changes stored in each data container to a separate data container page of a set of data container pages in the storage array, wherein each data container page is associated with a metadata page. A plurality of data container pages associated with a metadata page from a plurality of sets of data container pages in the storage array may be combined, thus defining a data container working set. The metadata page may be read from the storage array. The one or more metadata changes from the data container working set and the metadata page read from the storage array may be merged, thus defining an updated metadata page. The updated metadata page may be written to the storage array.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
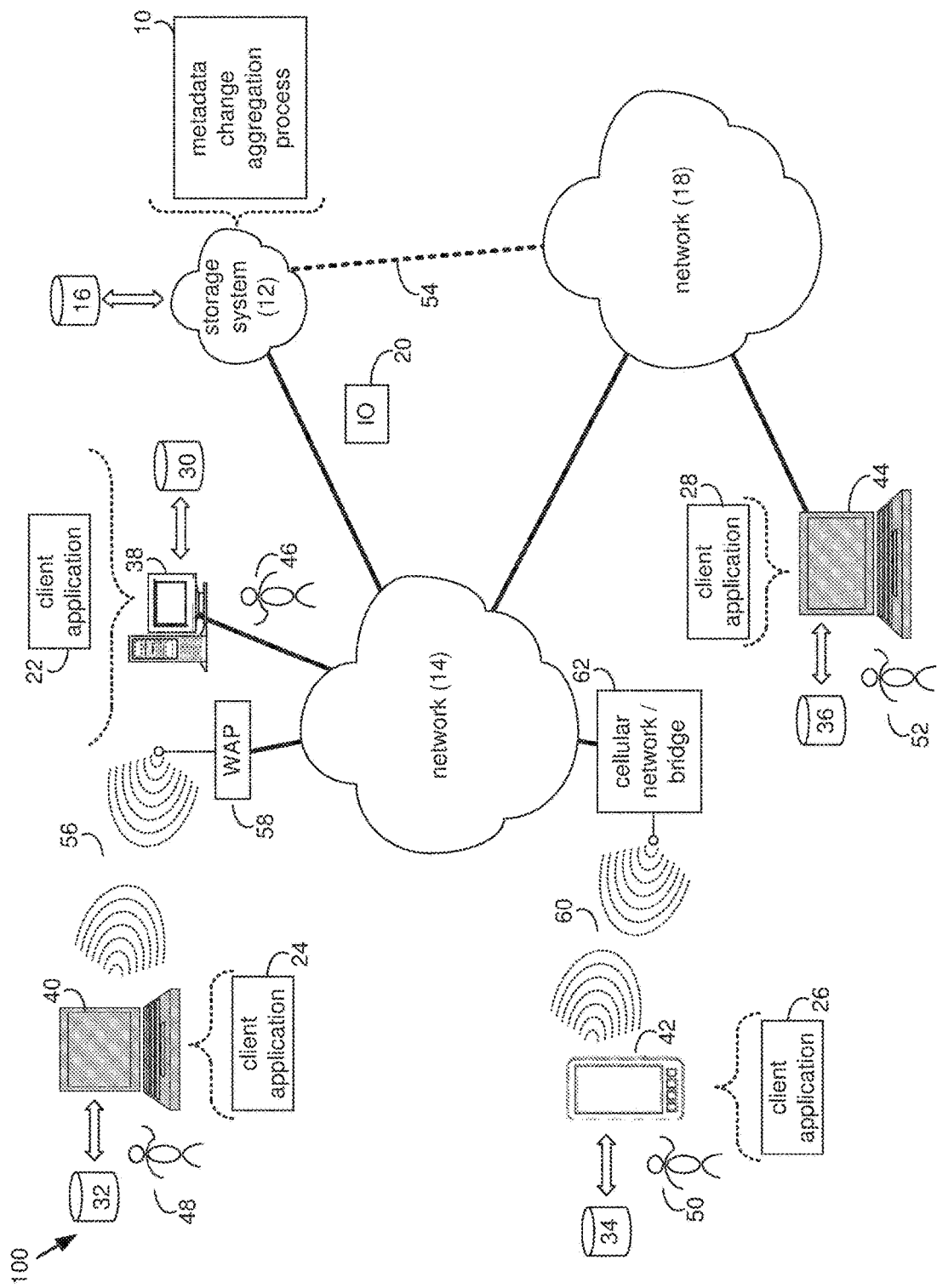
FIG. 1 is an example diagrammatic view of a storage system and a metadata change aggregation process coupled to a distributed computing network according to one or more example implementations of the disclosure.

Referring to FIG. 1, there is shown metadata change aggregation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata change aggregation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of metadata change aggregation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/ bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a metadata change aggregation process, such as metadata change aggregation process 10 of FIG. 1, may include but is not limited to, associating each data container of a first set of data containers in volatile memory with a metadata page. One or more metadata changes associated with a metadata page may be written to the data container associated with the metadata page. The one or more metadata changes stored in the first set of data containers may be written to a storage array.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
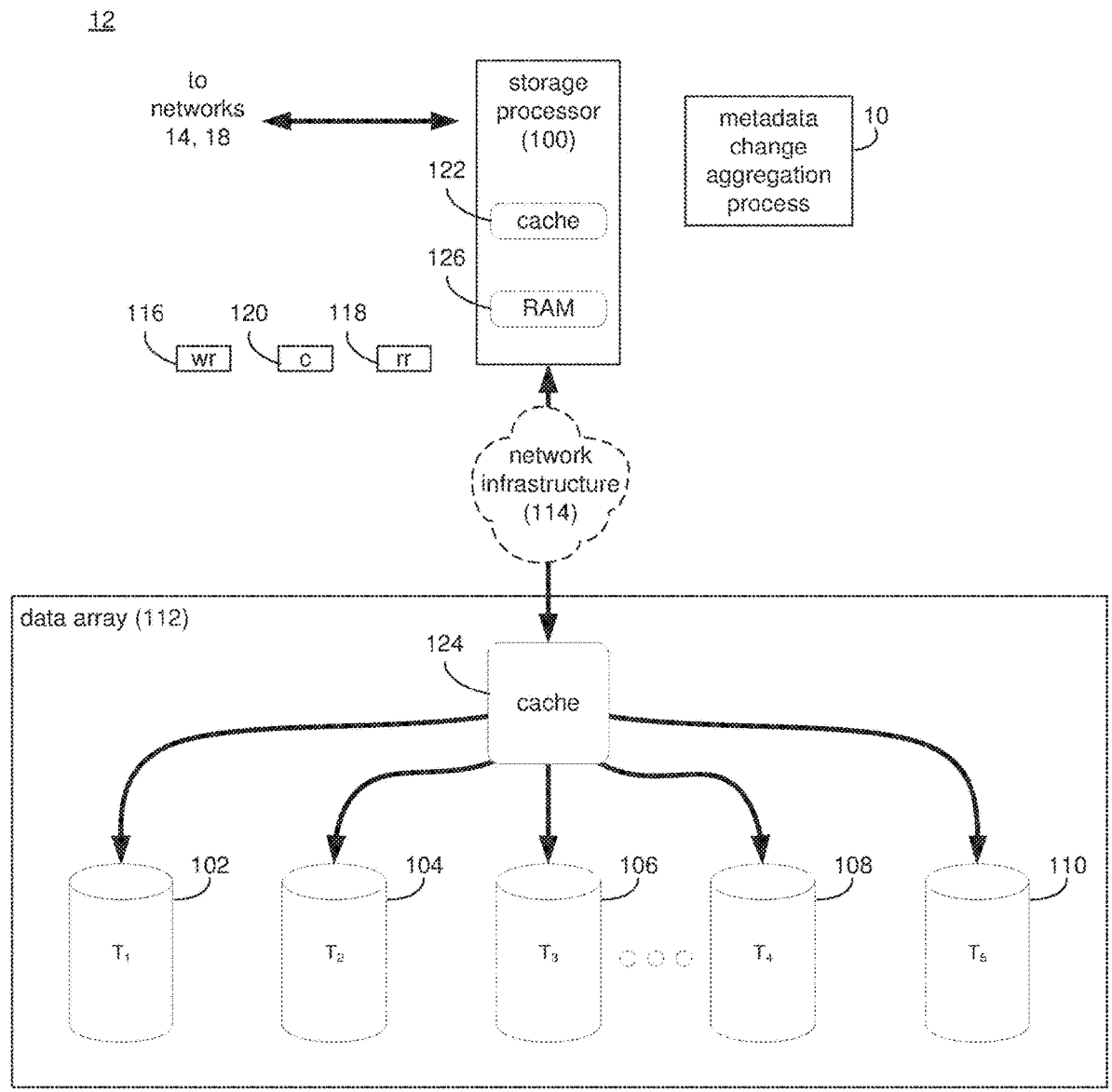
FIGS. 2-3 are example diagrammatic views of the storage system of FIG. 1 according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata change aggregation process 10. The instruction sets and subroutines of metadata change aggregation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of metadata change aggregation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of metadata change aggregation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata change aggregation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Metadata Architecture

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
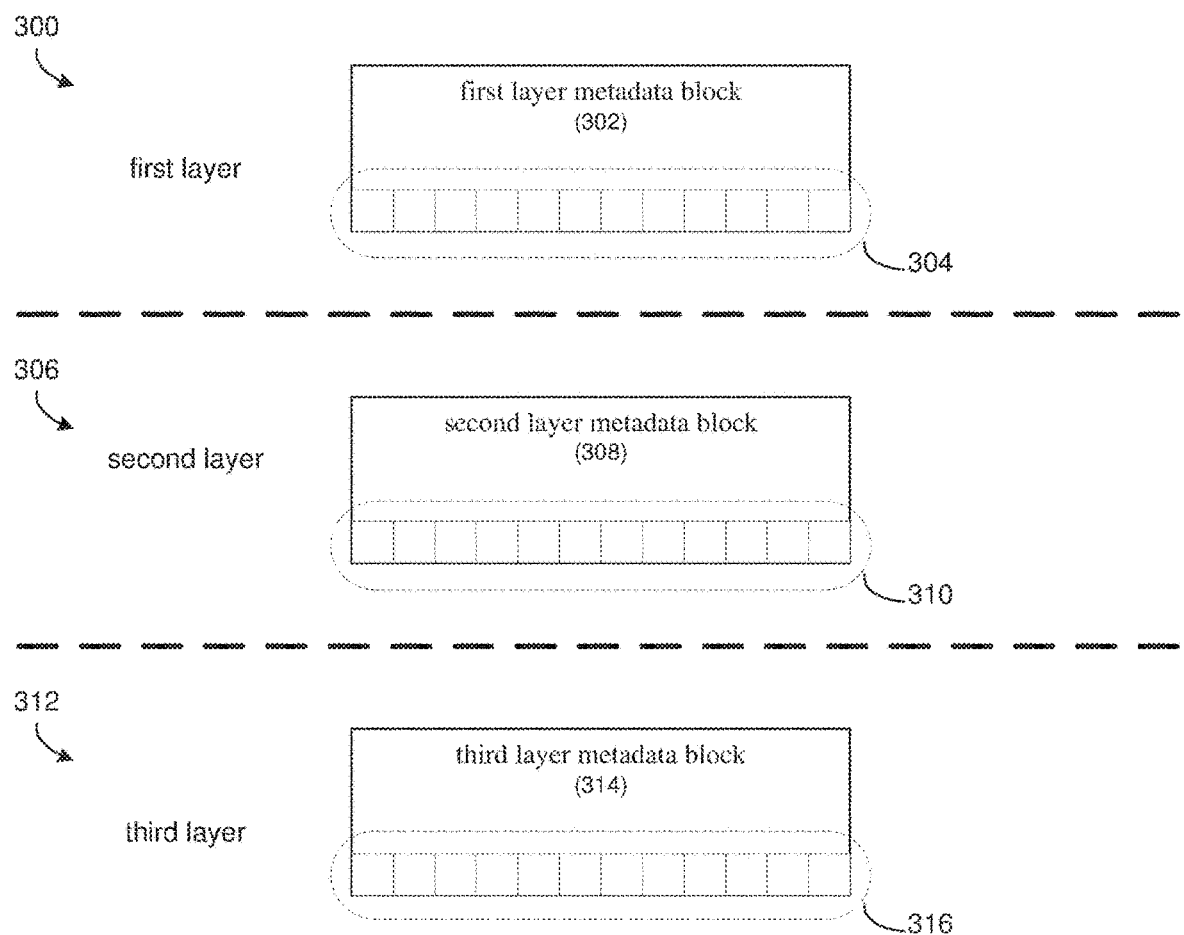
Figure 4:
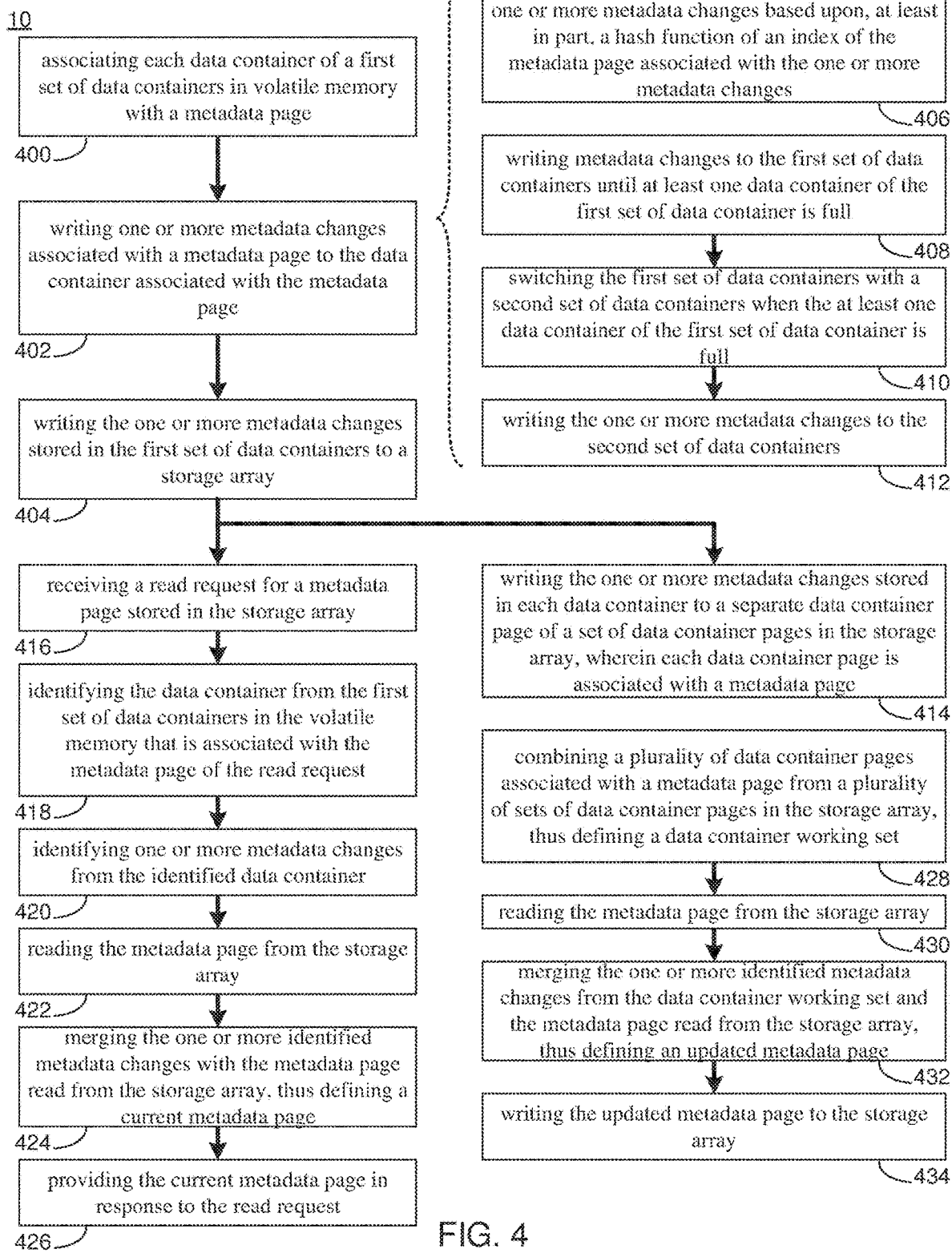
FIG. 4 is an example flowchart of the metadata change aggregation process of FIG. 1 according to one or more example implementations of the disclosure.

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one.

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may also be referred to as a metadata page and may have a predefined amount of storage capacity (e.g., 4 kilobytes) for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

The Metadata Change Aggregation Process

Referring also to FIGS. 4-7 and in some implementations, metadata change aggregation process 10 may associate 400 each data container of a first set of data containers in volatile memory with a metadata page. One or more metadata changes associated with a metadata page may be written 402 to the data container associated with the metadata page. The one or more metadata changes stored in the first set of data containers may be written 404 to a storage array.

As will be discussed in greater detail below, in many storage systems, data may be changed e.g., thousands of times per second. The ability to securely store data may be balanced against the speed at which the data, including changes to the data, may be stored. For example, the ability to process write requests may generally include the actions of receiving an IO write request, determining the destination of the new data of the write request, reading any pre-existing data, storing the new data, and acknowledging that the new data was stored. Consider an example where two write requests are received within a very short time frame and require modifying the same data. Each write request may specify a different modification to the same data. As such, each write request may include separate reads and writes to the same data in the storage array. As will be discussed in greater detail below, embodiments of the present disclosure may allow changes to data of a storage system to be aggregated before accessing the data from the storage system. Additionally, embodiments of the present disclosure may allow efficient read operations to be performed on the changes to the data even before the changes are applied to the data stored in the storage system.

In some implementations, metadata change aggregation process 10 may associate 400 each data container of a first set of data containers in volatile memory with a metadata page. In some implementations, a data container may generally include a data structure for storing one or more metadata changes or "deltas". In some implementations, the first set of data containers may include data structures of the same kind or different kinds or types of data structures. In some implementations and as will be discussed in greater detail below, the first set of data containers may be a set of hash-based sorted buckets. Each data container or bucket of the first set of data containers or buckets may be associated with a particular metadata page. For example and as will be discussed in greater detail below, each data container may store one or more changes associated with a particular metadata page. The first set of data containers may be stored in volatile memory. Volatile memory may generally include any temporary memory of a storage system. In one example, the memory may include Random Access Memory-(RAM) based storage within a storage processor (e.g., RAM-based storage 126 in storage processor 100). RAM-based memory system 126 may include non-persistent RAM-based storage. As is known in the art, non-persistent RAM-based storage is RAM-based storage that will lose its data in the event of e.g., a power failure. However, it will be appreciated that other forms or types of volatile memory may be used within the scope of the present disclosure.

In some implementations, associating 400 each data container of the set of data containers with a metadata page may be based upon, at least in part, a hash function of an index of the metadata page. For example, each metadata page may have an index for identifying or locating the metadata page. In some implementations, metadata change aggregation process 10 may perform a hash function on the logical index of the metadata page to associate a data container with a metadata page. In this manner, metadata change aggregation process 10 may randomize data containers or bucket access and filling in case of sequential or other non-random patterns. Accordingly, the set of data containers may be more balanced.

Figure 5:
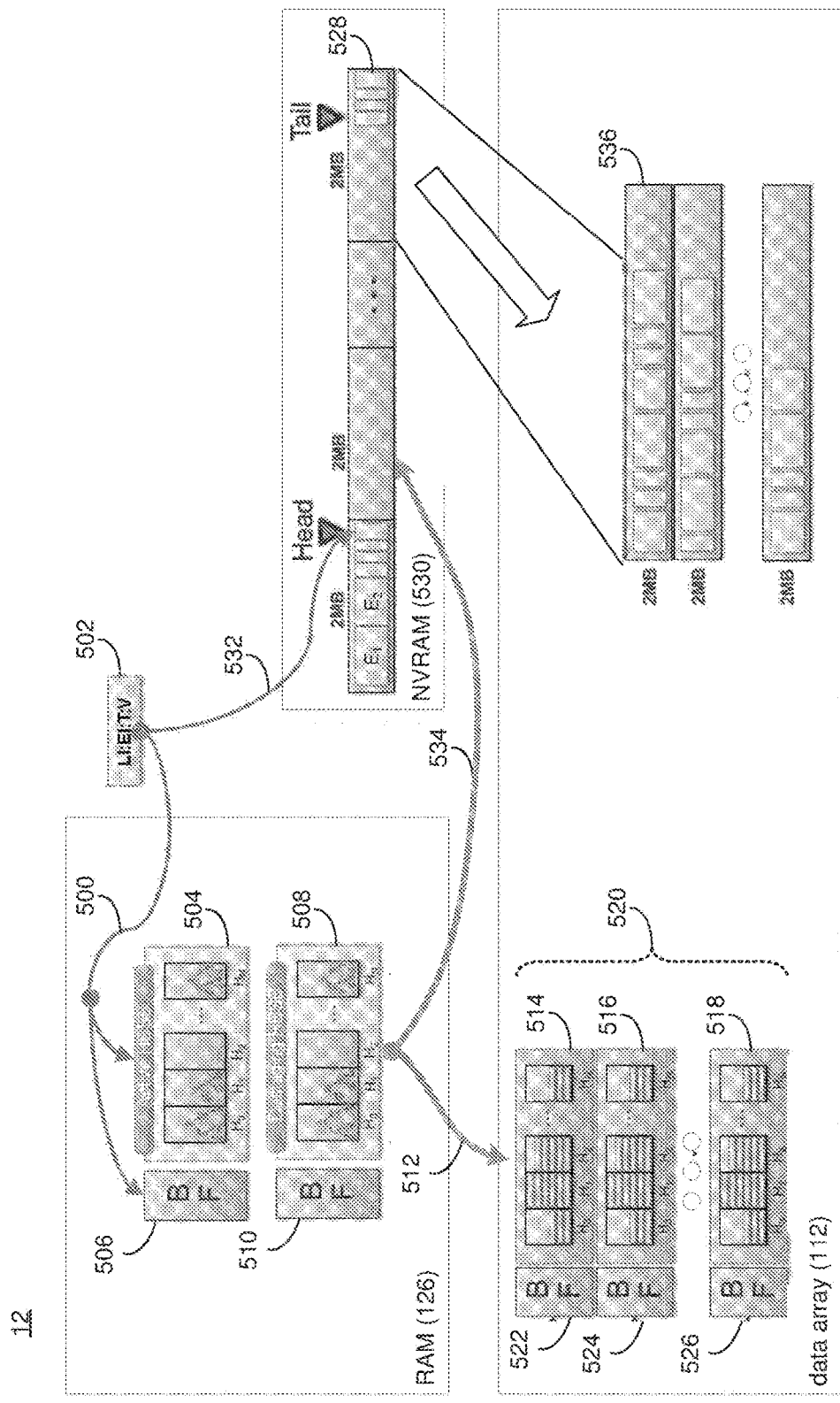
FIGS. 5-7 are example diagrammatic views of the metadata change aggregation process of FIG. 1 according to one or more example implementations of the disclosure.

In some implementations, metadata change aggregation process 10 may write 402 one or more metadata changes associated with a metadata page to the data container associated with the metadata page. Referring also to FIG. 5 and in some implementations, metadata change aggregation process 10 may receive one or more metadata changes associated with a metadata page. As discussed above, a storage processor (e.g., storage processor 100) may receive an IO write request that may specify a change to data and metadata within the storage array (e.g., data array 112). As discussed above, each portion of metadata may be stored in the storage array (e.g., data array 112) in a metadata page. Accordingly, the one or more changes may specify changes to a metadata page in the storage array.

In some implementations, the one or more metadata changes or deltas may be received or converted (e.g., by the storage processor) into a metadata update tuple. Referring to the example of FIG. 5 and in some implementations, the metadata update tuple may include various entries including, but not limited to, a logical index of a metadata page, an entry index referring to a specific entry or offset inside the metadata page, a record or delta type that defines the size of the delta, the payload or new value of the entry in the metadata page, etc. It will be appreciated that other information associated with a metadata change or delta may be defined in a metadata update tuple.

In some implementations, metadata change aggregation process 10 may determine 406 a target data container for writing the one or more metadata changes based upon, at least in part, a hash function of an index of the metadata page associated with the one or more metadata changes. For example, metadata change aggregation process 10 may determine the logical index of the metadata page from the metadata update tuple and perform a hash function on the logical index to determine a target data container for writing the more metadata changes. As discussed above, the same hash function may be used to associate specific data containers or bucket from a first set of data containers or hash based sorted buckets with a metadata page based upon, at least in part, the logical index of the metadata page.

Referring again to FIG. 5 and in some implementations, metadata change aggregation process 10 may route (represented by arrow 500) each delta or metadata change (metadata update tuple 502) to a specific data container or bucket of the first set of data containers (e.g., first set of data containers 504) according to the hash function taken from the logical index. In some implementations, each data container of the first set of data containers (e.g., first set of data containers 504) may be organized as a binary tree of deltas or metadata changes. For example, upon writing 402 the metadata change to a specific data container, metadata change aggregation process 10 may sort the metadata changes based upon, at least in part, an insertion order. In other words, each metadata change may be sorted in the binary tree structure within the data container based on when the metadata change was received. While a binary tree structure has been described, it will be appreciated that various sorting algorithms or data structures may be used within the scope of the present disclosure.

In some implementations, each set of data containers may be associated with a bloom filter. As is known in the art, a bloom filter is a data structure designed to determine, rapidly and memory-efficiently, whether an element is present in a set. In some implementations, the bloom filter may decrease the number of searches in the set of data containers in volatile memory. In some implementations, a bloom filter may determine whether or not a set of data containers includes one or more metadata changes for a particular metadata page. For example, a bloom filter (e.g., bloom filter 506) may implement false positive logic (i.e., the negative response from a bloom filter guarantees to a reasonably high accuracy rate) that there are not any metadata changes associated with a particular metadata page. In some implementations, each time a metadata change is written 402 to the first set of data containers, the bloom filter associated with the first set of data containers may be updated to reflect this metadata change.

In some implementations, writing 402 the one or more metadata changes to the first set of data containers may include writing 408 metadata changes to the first set of data containers until at least one data container of the first set of data container is full. In some implementations, each data container may have a pre-defined data limit before the data container is considered "full". For example and as will be discussed in greater detail below, each data container may be written to the storage array as a separate page (e.g., 4 KB). In this example, the page size may determine the pre-defined data limit of a data container. In other words, once a data container includes a page-worth of metadata changes, metadata change aggregation process 10 may determine that the data container is "full".

In some implementations, metadata change aggregation process 10 may switch 410 the first set of data containers with a second set of data containers when the at least one data container of the first set of data containers is full. The second set of data containers may be identical to the first set of data containers but may be empty at the time of switching. In other words, metadata change aggregation process 10 may associate each data container of the second set of data containers with a metadata page when associating 400 each data container of the first set of data containers with a metadata page. As discussed above, the second set of data containers may also include a set of hash-based sorted buckets. In some implementations, when the first set of data containers is being filled with one or more metadata changes, the first set of data containers may be considered the "active" set of data containers and the second set of data containers may be considered the "destaging" set of the data containers. As will be discussed in greater detail below, destaging may generally include writing the one or more metadata changes from a set of data containers to the storage array.

Referring again to FIG. 5 and in some implementations, the second set of data containers (e.g., second set of data containers 508) may be configured to switch with the first set of data containers (e.g., first set of data containers 504) when at least one data container of the first set of data containers (e.g., first set of data containers 504) is full. In some implementations, metadata change aggregation process 10 may write 412 one or more subsequent metadata changes to the second set of data containers. For example and in response to switching the second set of data containers with the first set of data containers, metadata change aggregation process 10 may write 412 one or more subsequent metadata changes (i.e., metadata changes received after switching the second set of data containers with the first set of data containers) to the second set of data containers. In some implementations, the second set of data containers may be associated with a bloom filter (e.g., bloom filter 510).

In some implementations, metadata change aggregation process 10 may write 404 the one or more metadata changes stored in the first set of data containers to a storage array. Referring again to the example of FIG. 5 and in some implementations, metadata change aggregation process 10 may receive one or more metadata changes and write 402 those metadata changes to various data containers of the first set of data containers. In some implementations and as discussed above, metadata change aggregation process 10 may determine that at least one data container of the first set of data containers is full. Metadata change aggregation process 10 may switch 410 a second set of data containers (e.g., second set of data containers 508) with the first set of data containers (e.g., first set of data containers 504). In response to switching 410 the first set of data containers with the second set of data containers, metadata change aggregation process 10 may write 412 one or more subsequent metadata changes to the second set of data containers (e.g., second set of data containers 508) and may write 404 the one or more metadata changes stored in the first set of data containers (e.g., first set of data containers 504) to a storage array (e.g., data array 112).

In some implementations, writing 404 the one or more metadata changes stored in the first set of data containers to the storage array may include writing 414 the one or more metadata changes stored in each data container to a separate data container page of a set of data container pages in the storage array, wherein each data container page is associated with a metadata page. For example and referring also to the example of FIG. 5, metadata change aggregation process 10 may write 404 (represented with arrow 512) the one or more metadata changes from the first set of data containers first set of data containers 504) to the storage array (e.g., data array 112) by writing 414 the one or more metadata changes stored in each data container to a separate data container page of a set of data container pages (e.g., set of data container pages 514, 516, 518). In this manner, the one or more metadata changes from each data container of the first set of data containers may be written 414 to a corresponding data container page of a set of data container pages set of data container pages 514, 516, 518). Accordingly, a particular set of data container pages (e.g., set of data container pages 514, 516, 518) may store the one or more metadata changes of a particular set of data containers (e.g., first set of data containers 514, 516, 518) in volatile memory (e.g., RAM 126).

As discussed above and in some implementations, each data container page or "bucket page" may have a pre-defined size of a metadata page (e.g., 4 KB). Similar to the set of data containers stored in volatile memory, each set of data container pages or "tablet" may have a data container page associated with a respective metadata page. In some implementations, a data container page may sort the one or more metadata changes for a particular metadata page by insertion time. In some implementations, a set of active tablets or multiple sets of data container pages (e.g., set of data container pages 514, 516, 518) may be organized in a storage array (e.g., data array 112) as a ring buffer (e.g., ring buffer 520). For example, a set of data container pages or a tablet may be added to a "head" of the ring buffer (e.g., ring buffer 520) and released or deleted from a "tail" of the ring buffer. The process of releasing or deleting a set of data container pages will be described in greater detail below.

In some implementations, the bloom filter associated with each set of data containers in volatile memory may be written to the storage array. For example, bloom filter 506 associated with first set of data containers 504 may be written to the storage array (e.g., data array 112) as bloom filter 522 while the first set of data containers 504 is written to set of data container pages 514. As will be discussed in greater detail below, the bloom filters associated with each set of data containers may be preserved in the form of bloom filters (e.g., bloom filters 522, 524, 526) associated with each set of data container pages (e.g., set of data container pages 514, 516, 518) to help reduce unnecessary searches in the one or more sets of data container pages (e.g., set of data container pages 514, 516, 518).

In some implementations and in response to writing 404 the one or more metadata changes from the first set of data containers, metadata change aggregation process 10 may clear the contents of each data container of the first set of data containers. Accordingly, the first set of data containers may be cleared for receiving additional metadata changes. For example and in some implementations, when metadata change aggregation process 10 determines that at least one data container of the second set of data containers (e.g., second set of data containers 508) is full, metadata change aggregation process 10 may switch the first set of data containers (e.g., first set of data containers 504) with the second set of data containers (e.g., second set of data containers 508) and write subsequent metadata changes to the data containers of the first set of data containers (e.g., first set of data containers 504) as discussed above. In response to switching the first set of data containers (e.g., first set of data containers 504) with the second set of data containers (e.g., second set of data containers 508), metadata change aggregation process 10 may write the one or more metadata changes stored in the second set of data containers (e.g., second set of data containers 508) to the storage array (e.g., data array 112). In this manner, metadata change aggregation process 10 may always have a set of data containers available for receiving metadata changes.

In some implementations, metadata change aggregation process 10 may write the one or more metadata changes to a metadata log in non-volatile memory. Referring again to the example of FIG. 5 and in some implementations, metadata change aggregation process 10 may generate a metadata log (e.g., metadata log 528) in non-volatile memory (e.g., non-volatile Random Access Memory (NVRAM) 530). In some implementations, the metadata log may store (indicated by arrow 532) metadata update tuples in time order (e.g., sorted oldest to newest). In some implementations, the contents (e.g., metadata update tuple 502) of the metadata log may be preserved in the event of a power failure or other failure of the RAM (e.g., RAM 126). In some implementations and in response to the failure of the RAM (e.g., RAM 126), metadata change aggregation process 10 may recover the one or more metadata changes from the metadata log (e.g., metadata log 528).

In some implementations and in response to destaging or writing the one or more metadata changes from the first set of data containers (e.g., first set of data containers 504) to the storage array (e.g., to a set of data container pages), metadata change aggregation process 10 may release or free (indicated by arrow 534) the corresponding part of the metadata log (e.g., metadata log 528). In some implementations, metadata change aggregation process 10 may determine that the metadata log (e.g., metadata log 528) is full and may write at least a portion of the one or more metadata changes stored in the metadata log to the storage array (e.g., data array 112). In some implementations, the at least a portion of the one or more metadata changes written to the storage array may be stored as e.g., 2 MB chunks (e.g., data chunk 536) in the storage array (e.g., data array 112). While a 2 MB chunk has been discussed, it will be appreciated that the at least a portion of the one or more metadata changes may be stored in various chunks or blocks of varying sizes.

In some implementations, metadata change aggregation process 10 may receive 416 a read request for a metadata page stored in the storage array. For example, metadata change aggregation process 10 may receive 416 a read request for a metadata page stored in the storage array after changes to the metadata page have been received but before the metadata changes have been applied to the metadata page stored in the storage array. Accordingly, metadata change aggregation process 10 may allow a user to read a current metadata page including metadata changes not yet saved to the metadata page in the storage array.

In some implementations, metadata change aggregation process 10 may identify 418 the data container from the first set of data containers in the volatile memory that is associated with the metadata page of the read request. As discussed above and in some implementations, metadata change aggregation process 10 may use the logical index of the metadata page to determine a target data container or bucket in the first set of data containers. Similarly, metadata change aggregation process 10 may identify 418 the data container from the first set of data containers in the volatile memory that is associated with the metadata page of the read request based upon, at least in part, a hash function of the index or logical index of the metadata page. In some implementations with a second set of data containers, metadata change aggregation process 10 may also identify 418 the data container from the second set of data containers in the volatile memory that is associated with the metadata page of the read request based upon, at least in part, a hash function of the index or logical index of the metadata page.

In some implementations, metadata change aggregation process 10 may identify 420 one or more metadata changes from the identified data container. For example and as discussed above, metadata change aggregation process 10 may search the bloom filters (e.g., bloom filters 506, 510) associated with the first set of data containers (e.g., first set of data containers 504) and the second set of data containers (e.g., second set of data containers 508) to identify 420 one or more metadata changes from the identified data container(s). If the bloom filter indicates that the data container contains one or more metadata changes for the metadata page of the read request, metadata change aggregation process 10 may add the one or more metadata changes from the first set of data containers and/or the second set of data containers to an "unmerged metadata change set".

In some implementations, metadata change aggregation process 10 may also search the one or more sets of data container pages stored in the storage array. In a manner similar to identifying the data container from the first set of data containers in the volatile memory that is associated with the metadata page of the read request, metadata change aggregation process 10 may identify a data container page from the one or more sets of data container pages stored in the storage array. For example, metadata change aggregation process 10 may search the bloom filters (e.g., bloom filters 522, 524, 526) associated with each set of data container pages (e.g., sets of data container pages 514, 516, 518) to identify 420 one or more metadata changes from the identified data container page(s). Similarly, if the bloom filter indicates that the data container page(s) contain one or more metadata changes for the metadata page of the read request, metadata change aggregation process 10 may add the one or more metadata changes from the set of data container pages to the "unmerged metadata change set".

In some implementations, metadata change aggregation process 10 may read 422 the metadata page from the storage array. For example, metadata change aggregation process 10 may determine which metadata page to read based upon, at least in part, the logical index of the metadata page. In some implementations, the metadata page may be read from a storage array (data array 112).

In some implementations, metadata change aggregation process 10 may merge 424 the one or more identified metadata changes with the metadata page read from the storage array, thus defining a current metadata page. For example, metadata change aggregation process 10 may merge the "unmerged metadata change set" with the metadata page read from the storage array to define a current metadata page.

In some implementations, metadata change aggregation process 10 may provide 426 the current metadata page in response to the read request. In this manner, metadata change aggregation process 10 may provide 426 a current metadata page with minimal read amplification by utilizing a single search of the first set of data containers and/or the second set of data containers to identify one or more metadata changes. This is in contrast to conventional storage systems where metadata changes are not organized into respective data structures based on a metadata page. Additionally, the use of the bloom filters may help reduce unnecessary searching of data containers and/or data container pages.

Figure 6:
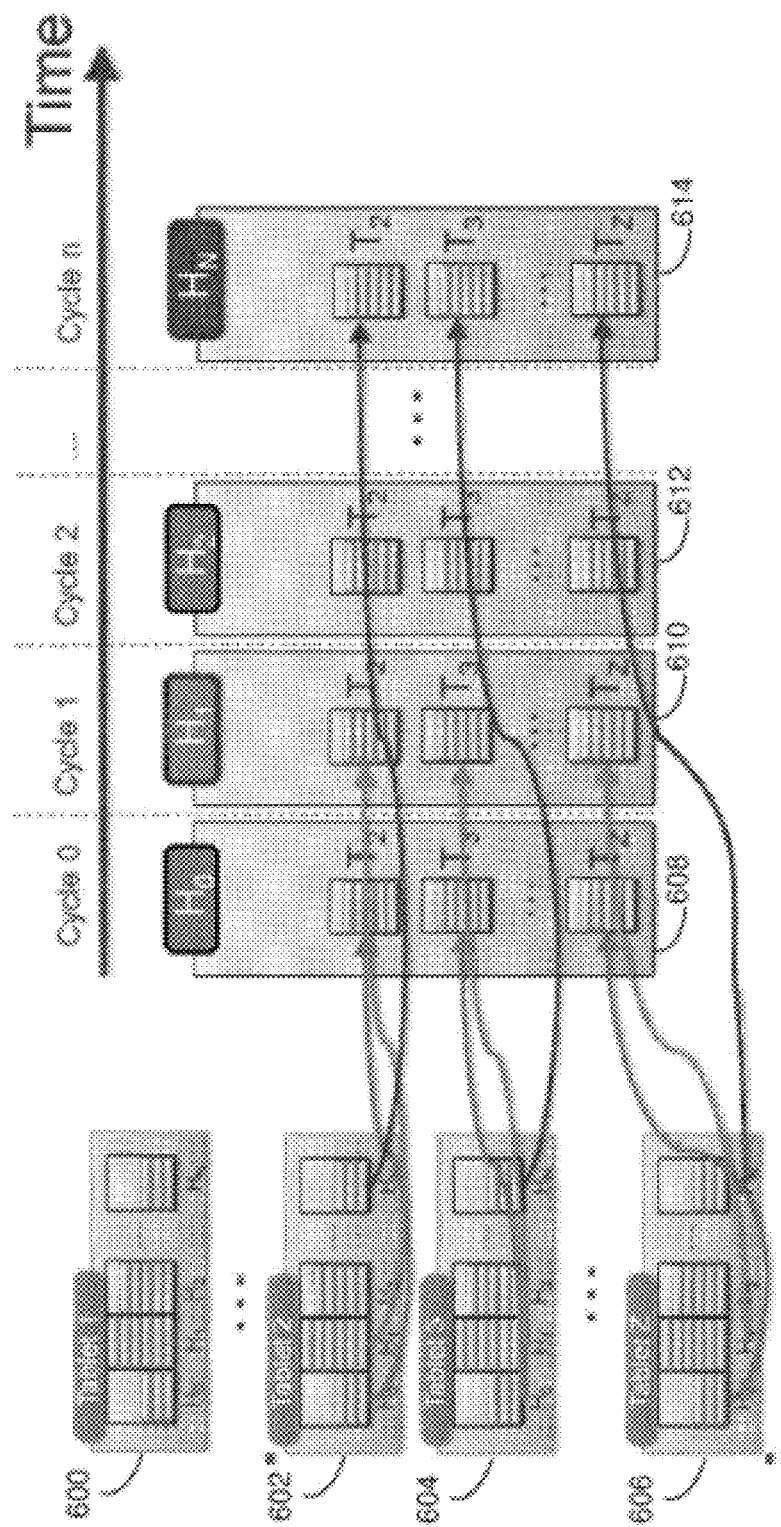

In some implementations, metadata change aggregation process 10 may aggregate the one or more metadata changes and write the one or more metadata changes to the metadata page. For example, metadata change aggregation process 10 may combine 428 a plurality of data container pages associated with a metadata page from a plurality of sets of data container pages in the storage array, thus defining a data container working set. Referring also to the example of FIG. 6, metadata change aggregation process 10 may combine a data container page associated with a particular metadata page from a plurality of sets of data container pages (e.g., set of data container pages 600, 602, 604, 606), thus defining a data container working set (e.g., data container working sets 608, 610, 612, 614). As shown in the example of FIG. 6, four sets of data container pages may include data container pages associated with (in this example) four metadata pages. Accordingly, metadata change aggregation process 10 may combine 428 the data container pages from each of the sets of data container pages (e.g., set of data container pages 600, 602, 604, 606) for each metadata page to define a data container working set or bucket working set for each metadata page (e.g., data container working sets 608, 610, 612, 614). In some implementations, metadata change aggregation process 10 may generate one data container working set per cycle. While a single data container working set per cycle has been described, it will be appreciated that any number of data container working sets may be generated per any number of cycles.

Figure 7:
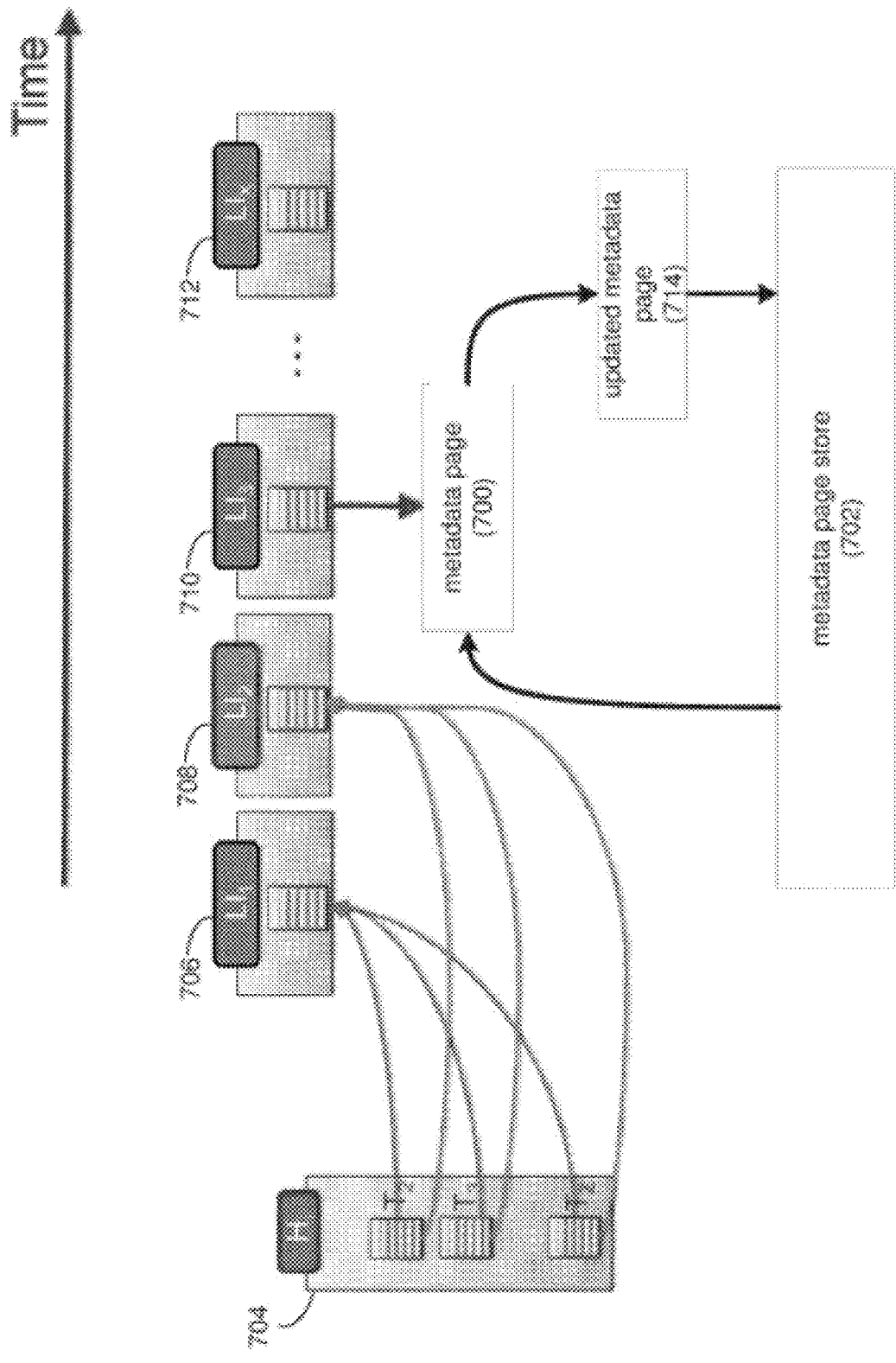

Referring also to the example of FIG. 7 and in some implementations, metadata change aggregation process 10 may read 430 the metadata page from the storage array. For example, metadata change aggregation process 10 may determine which metadata page to read based upon, at least in part, the logical index of the metadata page. In some implementations, the metadata page (e.g., metadata page 700) may be read from a metadata page store (e.g., metadata page store 702) on the storage array (data array 112).

In some implementations, metadata change aggregation process 10 may merge 432 the one or more metadata changes from the data container working set and the metadata page read from the storage array, thus defining an updated metadata page. Referring to the example of FIG. 7 and in some implementations, metadata change aggregation process 10 may sort the one or more metadata changes from a plurality of data container working sets (e.g., data container working set 704) by time, thus defining an aggregated list of metadata changes (e.g., aggregated lists 706, 708, 710, 712) for each metadata page. In response to sorting the one or more metadata changes from the data container working sets to define the aggregated list, metadata change aggregation process may merge 432 the aggregated list (e.g., aggregated list 710) and the metadata page read from the storage array (e.g., metadata page 700) to generate an updated metadata page (e.g., updated metadata page 714). In some implementations, metadata change aggregation process 10 may write 434 the updated metadata page to the storage array.

Metadata Log

Figure 8:
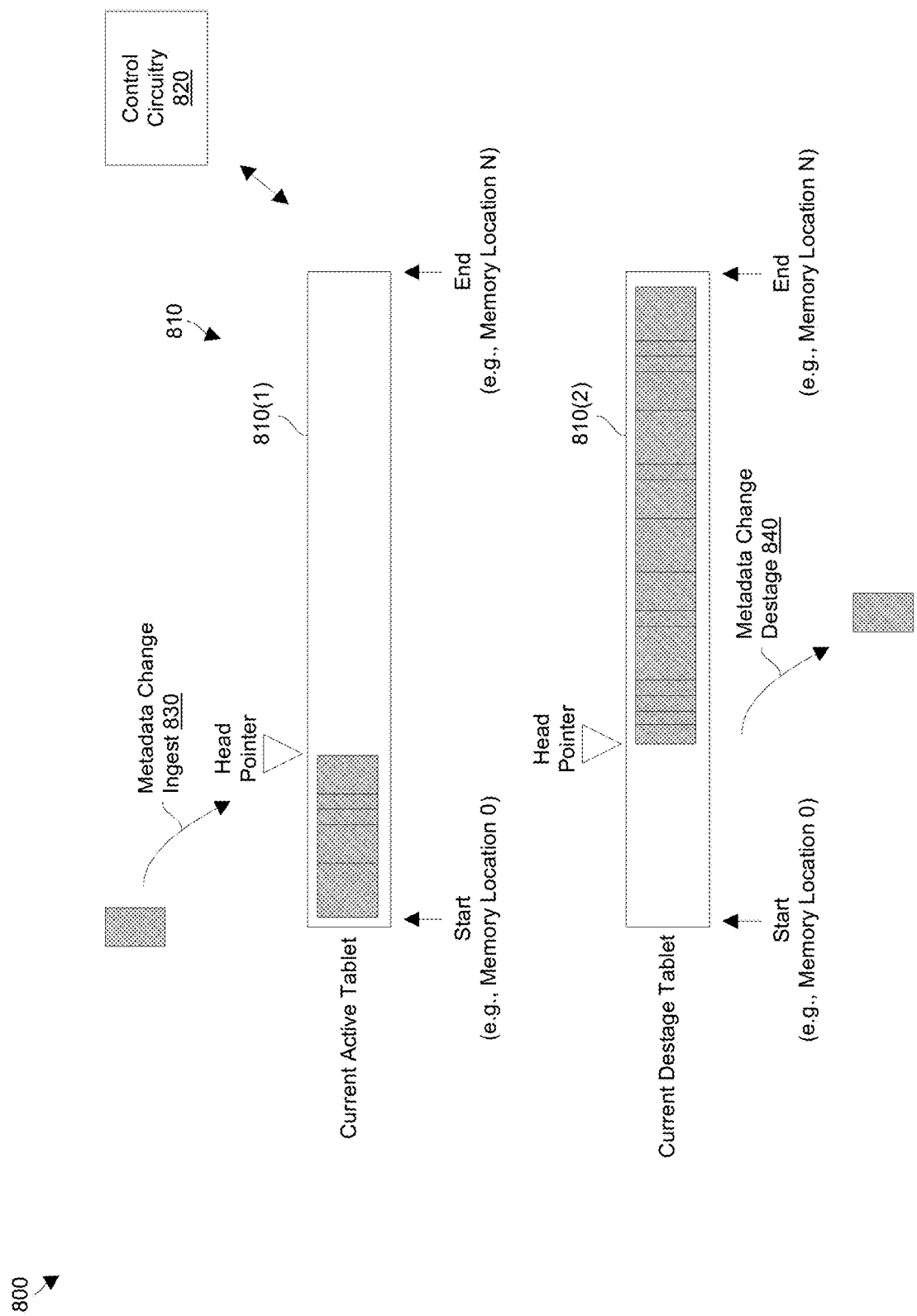
FIGS. 8 and 9 are example diagrammatic views of a portion of a metadata log architecture which is suitable for metadata change aggregation in accordance with certain embodiments.
Figure 9:
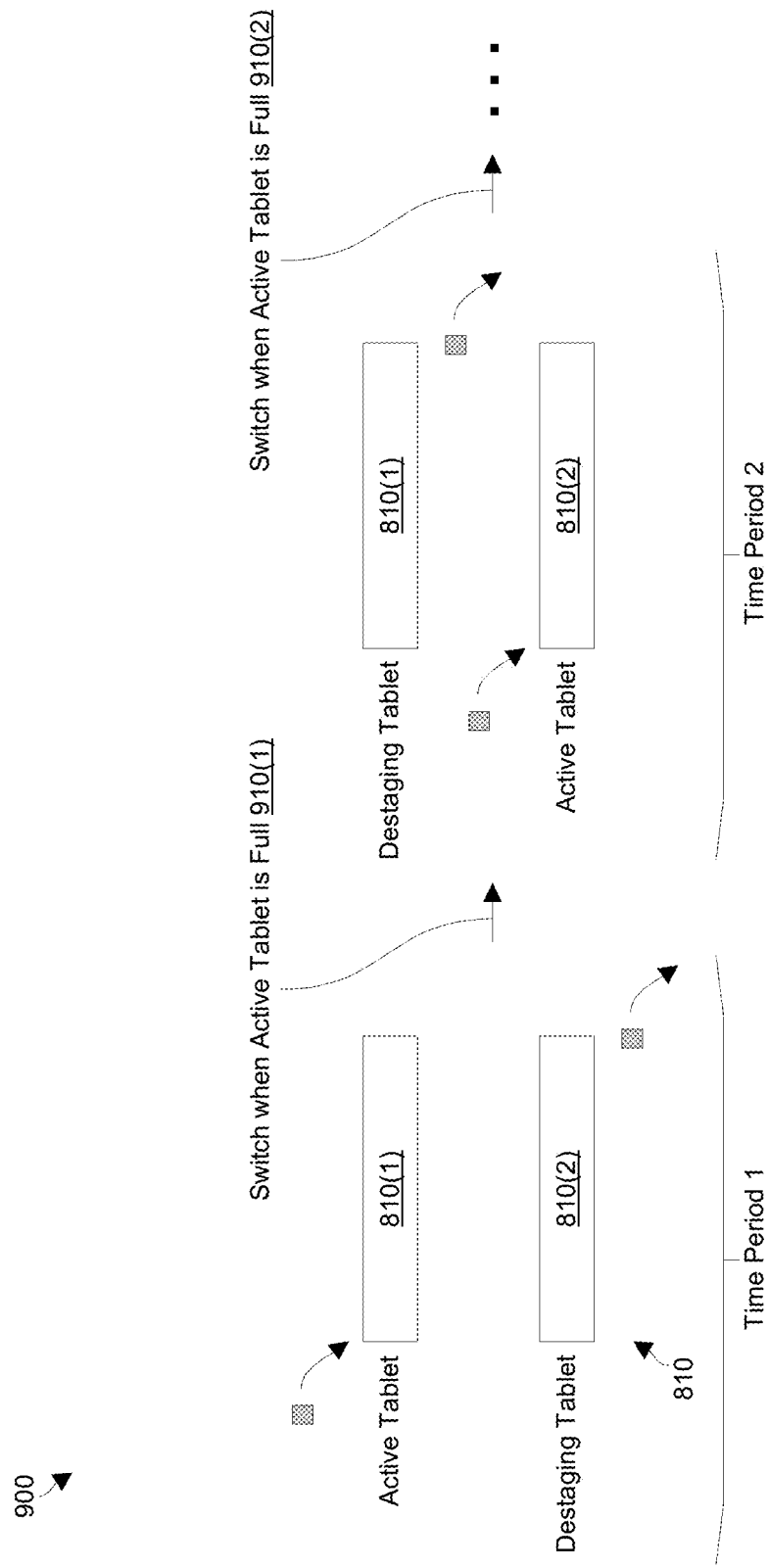

FIGS. 8 and 9 show certain details of a metadata log (or MDL) that is suitable for use by the storage system 12 (also see FIG. 5). The metadata log forms a portion of a log structured merge (LSM) tree that enables metadata change aggregation.

FIG. 8 shows a view 800 of two tablets 810(1), 810(2) (collectively, tablets 810) for processing metadata changes (or deltas). The tablets 810 are formed of contiguous memory pools. Such contiguous memory pools may use any form of memory (e.g., RAM, NVRAM, SSD, magnetic memory, etc.) and may be allocated when the tablets 810 are created. As shown in FIG. 8, the tablets 810 are of equal size and are each defined by a start (e.g., Memory Location 0) and an end (e.g., Memory Location N). The locations (or buckets) within the tablets 810 may be referenced via memory addresses, indexes (or keys) to identify bucket locations, combinations thereof, etc.

The control circuitry 820 of the storage system 12 (also see FIG. 2) processes metadata changes via a double buffering scheme. That is, the control circuitry 820 manages the tablets (or memory pools) 810 by designating a first tablet 810 (e.g., the tablet 810(1) in FIG. 8) as the current active tablet and a second tablet 810 (e.g., the tablet 810(2) in FIG. 8) as the current destaging tablet at a particular point in time. At a later time, the control circuitry 820 may perform a switch operation which reverses the designations so that the second tablet 810 (e.g., the tablet 810(2)) is then the current active tablet and the first tablet 810 (e.g., the tablet 810(1)) is then the current destaging tablet.

It should be understood that, for the sake of discussion, the operation of the various components may be explained in terms of the tablets performing certain actions or activities. However, it should be appreciated that control circuitry (e.g., specialized circuitry) actually performs the operations using the tablets in accordance with certain embodiments.

Additionally, the control circuitry 820 may use head pointers to coordinate use of the tablets 810. In particular, the control circuitry 820 may update these head pointers as metadata changes are ingested into the current active tablet and destaged from the current destaging tablet.

Along these lines, when the head pointer of the current active tablet points to the start (or 0), the current active tablet is empty. As the current active tablet fills with metadata changes (arrow 830 in FIG. 8), the control circuitry 820 moves the head pointer forward (i.e., from the lowest memory location to the highest memory location) to point to the next available location within the current active tablet (e.g., see the tablet 810(1)). Moreover, the control circuitry 820 may monitor the degree of "fullness" of the current active tablet based on how close the head pointer is to the end.

Similarly, metadata changes are destaged from the current destaging tablet (arrow 840 in FIG. 8) starting at the lowest memory location and ending at the highest memory location and the head pointer of the current destaging tablet points to the next metadata change to be destaged (e.g., see the tablet 810(2)). That is, destaging initiates from the start of the current destaging tablet to the end of the current destaging tablet. Accordingly, when the current destaging tablet is ready to be cleared for use as the current active tablet (e.g., via performance of the switch operation), clearing may be performed by simply resetting the head pointer to point back to the start. Further details are provided with reference to FIG. 9.

FIG. 9 shows a view 900 of certain details regarding how the tablets 810 alternate between active tablet operation and destaging tablet operation. It should be understood that such alternation may continue in an ongoing manner over time.

During time period 1, the tablet 810(1) ingests metadata changes while concurrently (or in parallel) the tablet 810(2) destages previously ingested metadata changes. It should be understood that resources of the storage system 12 are provisioned to perform the ingest and destaging operations such that the tablets 810 fill and empty at the same rate (or pace). Accordingly, when the active tablet becomes full, the destaging tablet becomes empty.

When the tablet 810(1) becomes full during time period 1, the control circuitry 820 (also see FIG. 8) performs a switch operation that switches the use of the tablets 810 (arrow 910(1) in FIG. 9). In particular, at this time, the control circuitry 820 checks to see that all of the previously ingested metadata changes have been destaged from the tablet 810(2) and, if so, clears the tablet 810(2) (e.g., by resetting the head pointer to point to the start of the tablet 810(2)) and switches the designations of the tablets 810. Accordingly, the tablet 810(1) is then designated as the destaging tablet and the tablet 810(2) is then designated as the active tablet in time period 2.

It should be noted that if not all of the previously ingested metadata changes have been destaged from the tablet 810(2) when the tablet 810(1) becomes full, the control circuitry 820 may wait for complete destaging of previously ingested metadata changes from the tablet 810(2). Once all of the previously ingested metadata changes have been destaged from the tablet 810(2), the control circuitry 820 performs the switch operation (arrow 910(1)).

Following the switch operation and during time period 2, the tablet 810(2) is now designated as the current active tablet and the tablet 810(1) is now designated as the current destaging tablet. Accordingly, the tablet 810(2) ingests metadata changes while the tablet 810(1) destages previously ingested metadata changes. Such operation continues until the tablet 810(2) (i.e., the current active tablet) becomes full.

When the tablet 810(2) becomes full, the control circuitry 820 performs another switch operation that again switches the use of the tablets 810 (arrow 910(2)). Following the switch at the end of the time period 2 (arrow 910(2)), the tablet 810(1) again ingests metadata changes while concurrently the tablet 810(2) again destages previously ingested metadata changes, and so on.

Performance Smoothness and Tolerance to Bursts

Various improvements may be made to the above described double buffering mechanism that processes metadata changes. Such improvements may address somewhat competing requirements. Along these lines and in accordance with certain embodiments, it should be appreciated that destaging should not operate excessively in a manner that wastes resources (e.g., CPU, memory, drive bandwidth, etc.). Rather, destaging may strive to achieve performance smoothness. In this manner, destaging at roughly the same pace may provide constant and reasonable latency and IOPs/bandwidth that avoids interfering with other tasks (e.g., ingest, host IOs, etc.).

However, it should be further appreciated that the ingest load on the metadata log may vary and may even include bursts at times. Unfortunately, as the active tablet fills up with metadata changes, there is less remaining capacity to accommodate bursts.

One approach to accommodating bursts of metadata changes is to increase the destaging pace thus performing destaging slightly faster than ingesting. Unfortunately, this approach is sub-optimal in that more resources would need to be consumed for destaging.

Another approach to accommodating bursts is to add another buffer (e.g., to perform triple buffering). Unfortunately, if another buffer is added, memory would be wasted in order to provide the additional capacity thus degrading the ability for the metadata log to improve write amortization.

In contrast to such approaches and in accordance with certain embodiments, improved techniques are directed to processing metadata changes using tablets that are partitioned to provide reserved space and regular space. The tablets form at least a portion of a metadata log for aggregating metadata changes. Along these lines, previously ingested metadata changes may be destaged from the reserved space of the current destaging tablet ahead of the regular space. Accordingly, if the current active tablet is close to becoming full and a burst occurs, the reserved space of the current destaging tablet may be used for ingesting some or all of the burst since the reserve space of the current destaging tablet would be emptied first and would thus be available. By reusing the reserved space of the current destaging tablet in this manner, the metadata log is tolerant for bursts but nevertheless allows for maintaining a smooth destaging pace, while not using extra memory.

Figure 10:
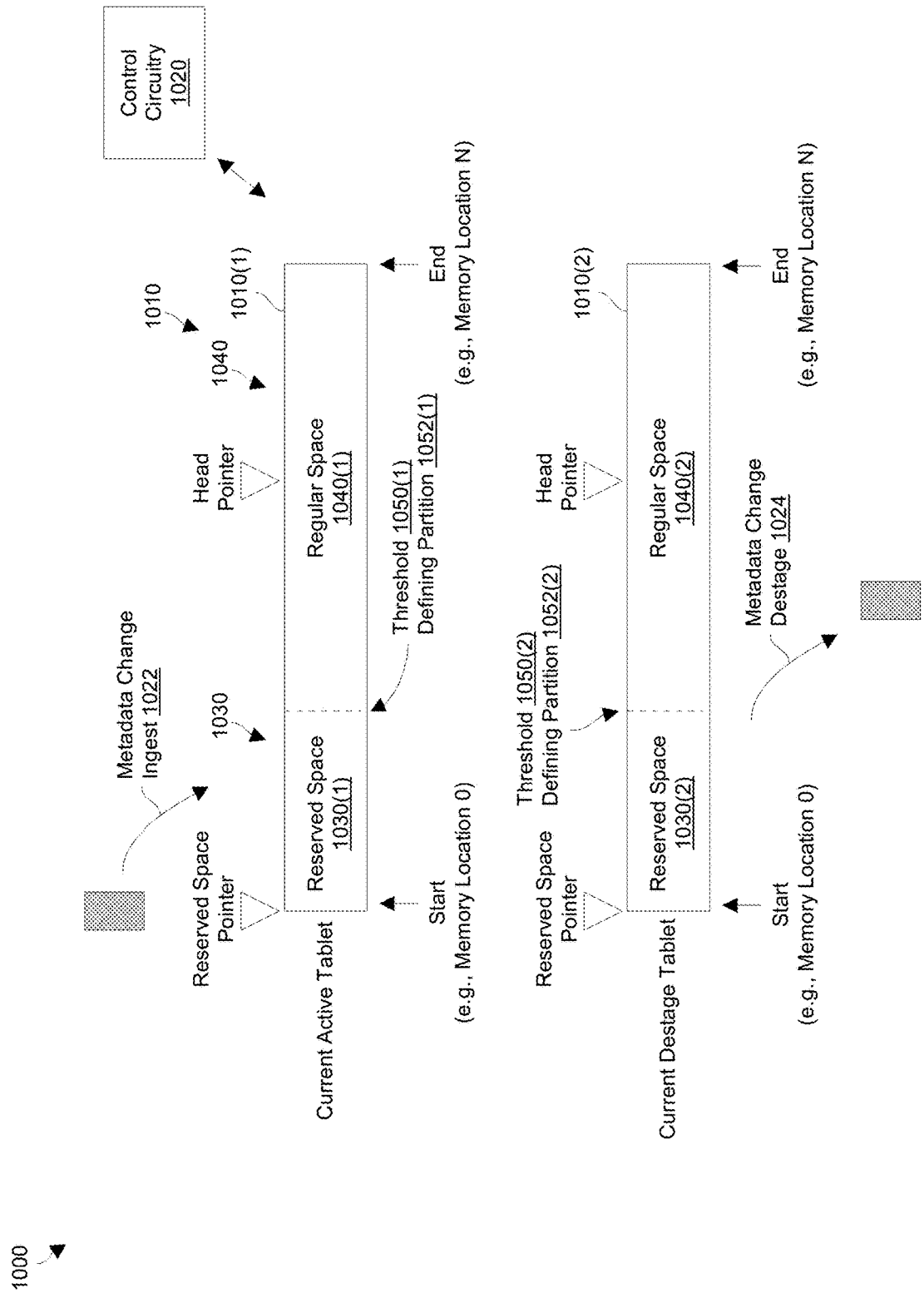
FIGS. 10 and 11 are other example diagrammatic views of a portion of a metadata log architecture which is suitable for metadata change aggregation in accordance with certain embodiments.
Figure 11:
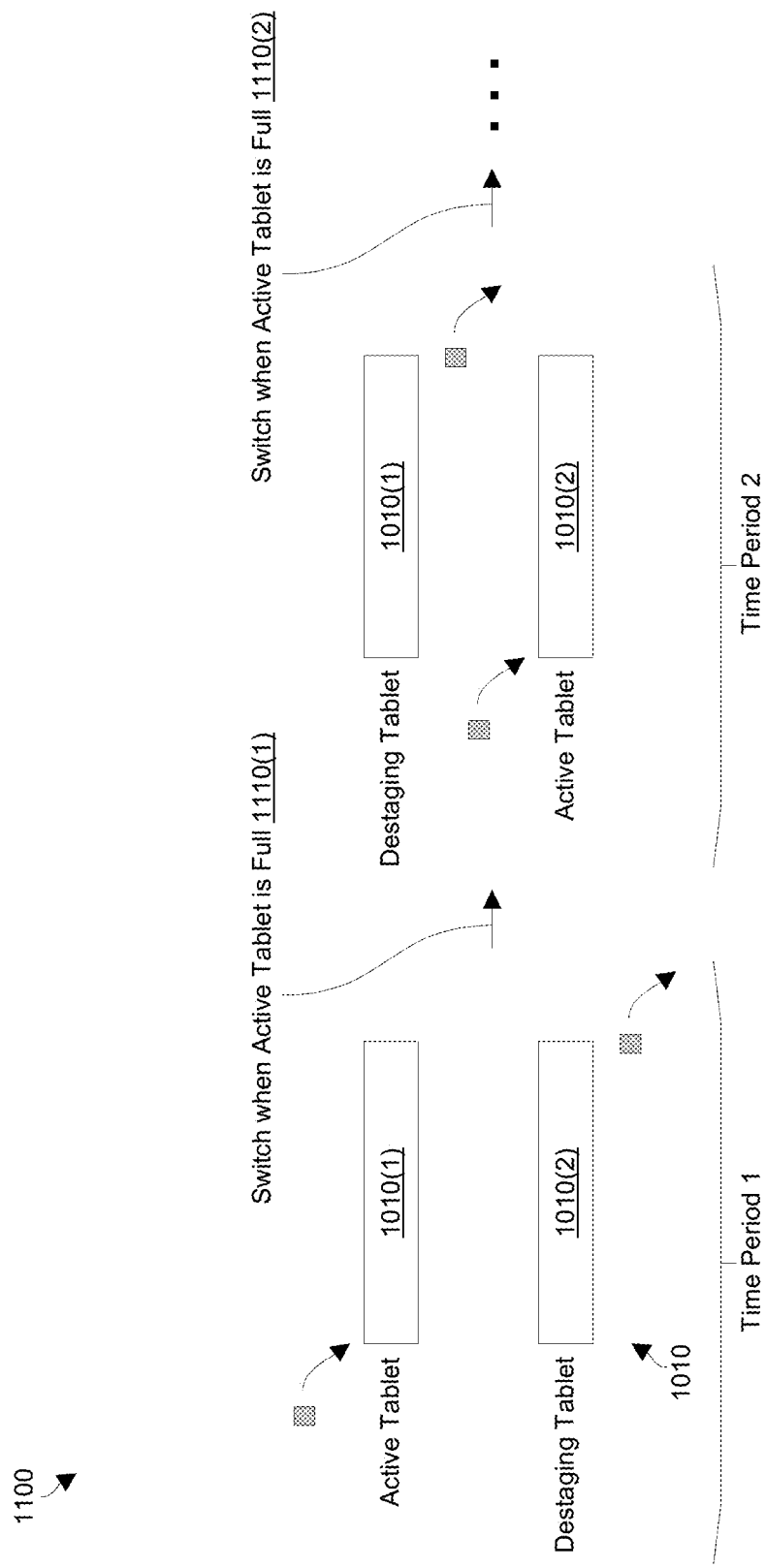

FIGS. 10 and 11 show certain details of a metadata log that is suitable for use by the storage system 12 (also see FIG. 5). In particular, the metadata log forms a portion of a LSM tree that is involved in metadata change aggregation.

FIG. 10 shows a view 1000 of two tablets 1010(1), 1010(2) (collectively, tablets 1010) and control circuitry 1020 which couples with the tablets 1010. The tablets 1010 and the control circuitry 1020 are similar to those of the earlier-discussed tablets 810 and control circuitry 820 (also see FIGS. 8 and 9). Accordingly, certain details of the operation of the tablets 1010 and the control circuitry 1020 may be omitted from further discussion since the operation has already been described in the context of the tablets 810 and the control circuitry 820 (also see FIGS. 8 and 9).

Along these lines, the tablets 1010 are formed of contiguous memory pools and may use any form of memory (e.g., RAM, NVRAM, SSD, magnetic memory, etc.). As shown in FIG. 10, the tablets (or pools) 1010 are of equal size and are each defined by a start (e.g., Memory Location 0) and an end (e.g., Memory Location N). The locations (or buckets) within the tablets 1010 may be referenced via memory addresses, indexes (or keys) to identify bucket locations, combinations thereof, etc.

The control circuitry 1020 processes metadata changes via a double buffering scheme. Along these lines, the control circuitry 1020 manages the tablets 1010 by designating a first tablet 1010 (e.g., the tablet 1010(1) in FIG. 10) as the current active tablet and a second tablet 1010 (e.g., the tablet 1010(2) in FIG. 10) as the current destaging tablet at a particular point in time. At a later time, the control circuitry 1020 may perform a switch operation which reverses the designations so that the second tablet (e.g., the tablet 1010 (2)) is then the current active tablet and the first tablet 1010 (e.g., the tablet 1010(1)) is then the destaging tablet.

Additionally, the control circuitry 1020 may use head pointers (labelled "Head Pointer in FIG. 10) to coordinate use of the tablets 1010. In particular, the control circuitry 1020 may update these head pointers as metadata changes are ingested into the current active tablet and destaged from the current destaging tablet.

Along these lines, when the head pointer of the current active tablet points to the start, the current active tablet is empty. As the current active tablet fills with metadata changes (arrow 1022 in FIG. 10), the control circuitry 1020 moves the head pointer forward (i.e., from the lowest memory location to the highest memory location) to point to the next available location within the current active tablet (e.g., see the tablet 1010(1)). Moreover, the control circuitry 1020 may monitor the degree of "fullness" of the current active tablet based on how close the head pointer is to the end.

Similarly, metadata changes are destaged from the current destaging tablet (arrow 1024 in FIG. 10) starting at the lowest memory location and ending at the highest memory location and the head pointer of the current destaging tablet points to the next metadata change to be destaged (e.g., see the tablet 1010(2)). That is, destaging initiates from the start of the current destaging tablet to the end of the current destaging tablet. Accordingly, when the current destaging tablet is ready to be cleared for use as the current active tablet (e.g., via performance of the switch operation), clearing may be performed by simply resetting the head pointer to point back to the start.

However, in contrast to the earlier-discussed tablets 810 and control circuitry 820, the control circuitry 1020 partitions the tablets 1010 into reserved spaces (or pools) 1030 and regular spaces 1040. In particular and as shown in FIG. 10, the control circuitry 1020 uses a threshold 1050(1) to define a partition 1052(1) that separates the tablet 1010(1) into a reserved space 1030(1) and a regular space 1040(1). Likewise, the control circuitry 1020 uses a threshold 1050 (2) to define a partition 1052(2) that separates the tablet 1010(2) into a reserved space 1030(2) and a regular space 1040(2).

Additionally, when a tablet 1010 (e.g., see the tablet 1010(1)) ingests a metadata change (arrow 1022), the control circuitry 1020 places the metadata change within a location (or bucket) of the tablet 1010 based on a hash of the metadata page being modified by the metadata change. In particular, lowest-index metadata changes are placed into the reserved space 1030 nearest the start (index 0) and higher-index metadata changes are placed into the regular space 1040 nearest the end. Accordingly, the tablet 1010 tends to fill evenly (i.e., there is even distribution of metadata changes within the tablet 1010) with some metadata changes going into the reserved space 1030 and other metadata changes going into the regular space 1040 of the tablet 1010.

Furthermore, the control circuitry 1020 maintains an additional pointer (labelled "reserved space pointer" in FIG. 10) for each tablet 1010. In particular, the control circuitry 1020 uses the reserved space pointer for the tablet 1010(1) to track usage (or fullness) of the reserved space 1030(1) of the tablet 1010(1) when the tablet 1010(1) is the current active tablet. Similarly, the control circuitry 1020 uses the reserved space pointer for the tablet 1010(2) to track usage of the reserved space 1030(2) of the tablet 1010(2) when the tablet 1010(2) is the current active tablet.

At this point, if the reserved space 1030 or the regular space 1040 of the current active tablet becomes full, the control circuitry 1020 directs use of the reserved space 1030 in the current destaging tablet 1010 (e.g., see the tablet 1010(2) in FIG. 10). That is, memory within the reserved space 1030 in the current destaging tablet 1010 is available at this point of operation since ingest and destaging occur in parallel at roughly the same pace with destaging of the reserved space occurring first. Accordingly, when the current active tablet is almost full, the current destaging tablet is almost empty. Since the control circuitry 1020 manages placement of the metadata changes within the tablets 1010 such that the lowest-index metadata changes are placed nearest the start and the highest-index metadata changes are placed nearest the end, the reserved space 1030 of the current destaging tablet will be empty.

In accordance with certain embodiments, the control circuitry 1020 manages a flag, i.e., an IsDestaged flag, for each location (or bucket) within the current destaging tablet. That is, for each location, the control circuitry 1020 sets the IsDestaged flag to TRUE when all of the metadata changes have been destaged. However, the IsDestaged flag is set to FALSE if not all of the metadata changes have been destaged.

Further details may be apparent with the following example. Suppose that the tablet 1010(1) is currently the active tablet and the tablet 1010(2) is currently the destaging tablet. Further suppose that ingest and destaging have been operating in parallel such that the tablet 1010(1) is almost full and the tablet 1010(2) is almost empty. However, it is possible that the reserved space 1030 or the regular space 1040 of the tablet 1010(1) may become full or close to full.

At this point, if there is an incoming burst (or sudden heavy load) of metadata changes to process, it is possible that the tablet 1010(1) may not have the capacity to accommodate the burst. However, the control circuitry 1020 is able to use space in the reserved space 1030(2) of the tablet 1010(2) such that the burst is fully ingested and performance remains smooth. Accordingly, even though the tablet 1010(1) is the current active tablet and the tablet 1010(2) is the current destaging tablet, ingest was accomplished by placing one or more metadata changes in the reserved space 1030(2) of the tablet 1010(2) because the memory within the reserved space 1030(2) was available. Further details will now be provided with reference to FIG. 11.

FIG. 11 shows a view 1100 of certain details regarding how the tablets 1010 alternate between active tablet operation and destaging tablet operation. It should be understood that such alternation may continue in an ongoing manner. As mentioned earlier with reference to FIGS. 8 and 9), certain details of the operation of the tablets 1010 and the control circuitry 1020 may be omitted from further discussion since such operation has already been described in the context of the tablets 810 and the control circuitry 820.

During time period 1 of FIG. 11, the tablet 1010(1) ingests metadata changes while concurrently the tablet 1010(2) destages previously ingested metadata changes. It should be understood that resources of the storage system 12 are provisioned to the ingest and destaging operations such that the tablets 1010 fill and empty at the same rate (or pace). Furthermore, it should be understood that filling of the active tablet is according to indexing based on hashing of the metadata pages where the lower-indexed metadata changes are placed in the reserved space 1030 of the active tablet and the higher-indexed metadata changes are placed in the regular space 1030 of the active tablet. Additionally, destaging of previously ingested metadata changes occurs from the destaging tablet starting with the metadata changes in the reserved space 1030 of the destaging tablet (i.e., the reserved space 1030 of the destaging tablet is emptied first starting at index 0). As a result, when the active tablet becomes full, the destaging tablet becomes empty.

However, as mentioned earlier, when the active tablet is close to becoming full, the active tablet has little remaining capacity to handle a burst or sudden heavy load. Nevertheless, since the reserved space 1030 of the destaging tablet is destaged at that point and thus available, the metadata changes that the active tablet is unable to handle (e.g., the reserved space 1030 of the active tablet might be full or alternatively the regular space 1040 of the active tablet might be full) are consumed by the reserved space 1030 of the destaging tablet. Such operation enables the metadata log to continue smooth operation but tolerate bursts of metadata changes.

When the tablet 1010(1) eventually becomes full during time period 1, the control circuitry 1020 (also see FIG. 10) performs a switch operation that switches the use of the tablets 1010 (arrow 1110(1) in FIG. 11). In particular, at this time, the control circuitry 1020 checks to see that all of the previously ingested metadata changes have been destaged from the tablet 1010(2) and, if so, clears the tablet 1010(2) (e.g., by resetting the head pointer to point to the start of the tablet 1010(2)) and switches the designations of the tablets 1010. Accordingly, the tablet 1010(1) is then designated as the destaging tablet and the tablet 1010(2) is then designated as the active tablet in time period 2.

It should be noted that if not all of the previously ingested metadata changes have been destaged from the regular space 1040(2) of the tablet 1010(2) when the tablet 1010(1) becomes full, the control circuitry 1020 may wait for complete destaging of previously ingested metadata changes from the regular space 1040(2) of the tablet 1010(2). Once all of the previously ingested metadata changes have been destaged from the regular space 1040(2), the control circuitry 1020 performs the switch operation (arrow 1110(1)).

Following the switch operation and during time period 2, the tablet 1010(2) is now designated as the current active tablet and the tablet 1010(1) is now designated as the current destaging tablet. At this point, the tablet 1010(2), which now has the role of being the active tablet, may have metadata changes residing in the reserved space 1030(2) (also see FIG. 10). In this situation, once all of the buckets of the reserved space 1030(2) have been destaged, the control circuitry 1020 resets the reserved space 1030(2) and the reserved space 1030(1) of the tablet 1010(1) which now has the role of being the destaging tablet.

Accordingly, the tablet 1010(2) ingests metadata changes while the tablet 1010(1) destages previously ingested metadata changes. Such operation continues until the tablet 1010(2) (i.e., the current active tablet) becomes full.

Again, when the active tablet is close to becoming full, the active tablet may have little remaining capacity to handle a burst or sudden heavy load. Nevertheless, since the reserved space 1030 of the destaging tablet is destaged at that point and is therefore available, the metadata changes that the active tablet may be unable to handle may be placed in the reserved space 1030 of the destaging tablet. Such operation again enables the metadata log to continue smooth operation but tolerate bursts of metadata changes.

When the tablet 1010(2) becomes full, the control circuitry 1020 performs another switch operation that again switches the use of the tablets 1010 (arrow 1110(2) in FIG. 11). Following the switch at the end of the time period 2 (arrow 1110(2)), the tablet 1010(1) again ingests metadata changes while concurrently the tablet 1010(2) again destages previously ingested metadata changes, and so on. Further details will now be provided with reference to FIGS. 12 through 14.

Figure 12:
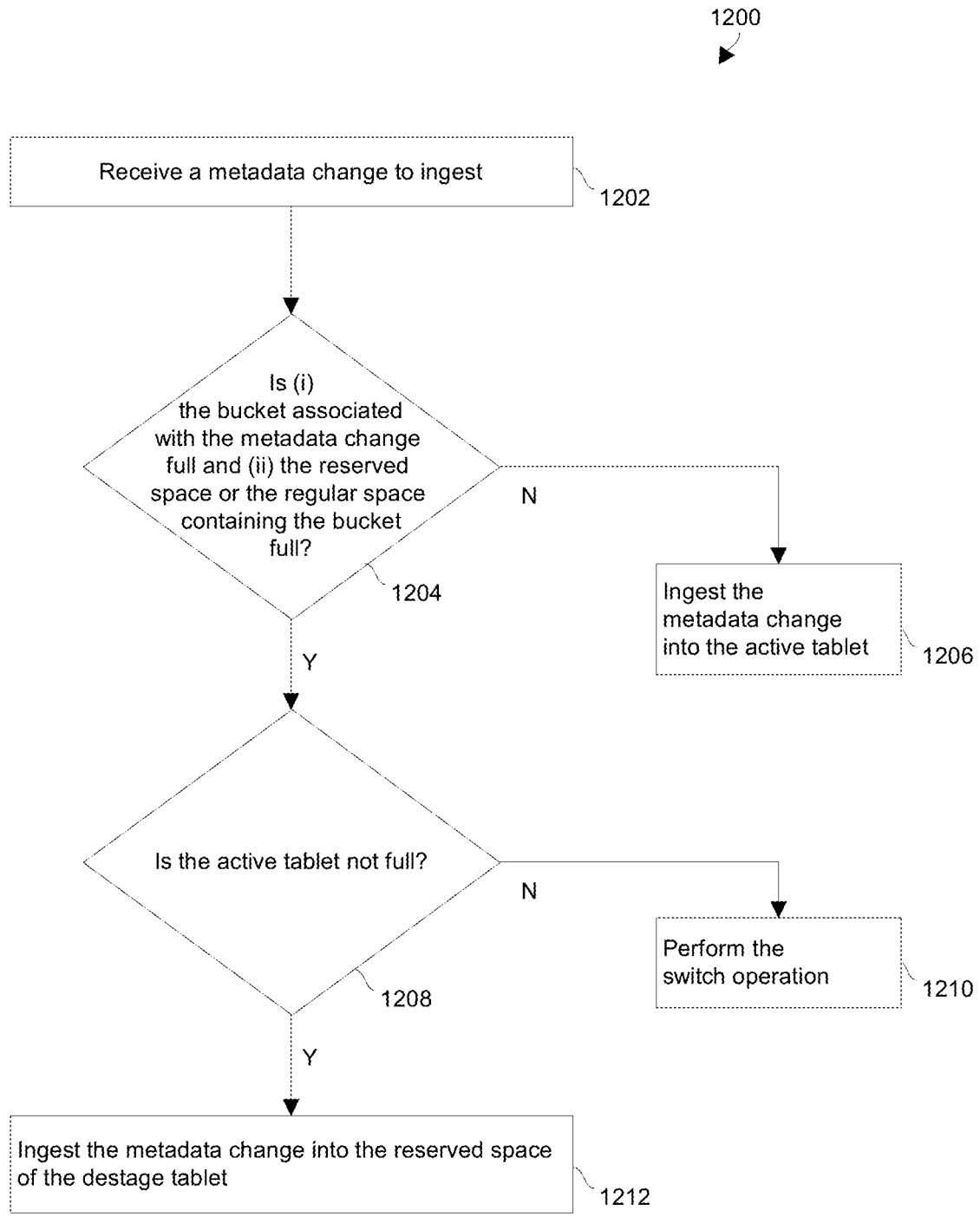
FIGS. 12 through 14 are views of certain flows which are suitable for metadata change aggregation in accordance with certain embodiments.

FIG. 12 shows a flow 1200 for processing a metadata change using a metadata log which is constructed and arranged for smooth performance and burst tolerance. As explained above in connection with FIGS. 10 and 11, such a metadata log utilizes tablets that are partitioned to provide reserved space and regular space.

At 1202, specialized circuitry that operates the metadata log (e.g., see the control circuitry 1020 in FIG. 10) receives a metadata change for ingesting. As explained earlier, a hash may be performed on the metadata page that is to be changed in order to generate an index (or key) that directs positioning or locating with the active tablet during ingestion (e.g., bucket identification). Along these lines, viewing the active tablet as an indexed series of buckets, the lowest-indexed changes may be put in the bucket that is nearest the start of the active tablet while the highest-indexed changes may be put in the bucket that is nearest the end of the active tablet.

At 1204, the specialized circuitry determines (i) whether the particular bucket associated with the metadata change is full (i.e., the identified bucket) and (ii) whether the reserved space or the regular space within which the particular bucket resides is full. If the particular bucket associated with the metadata change is not full and if the reserved space or the regular space within which the particular bucket resides is not full, 1204 proceeds to 1206. However, if the particular bucket associated with the metadata change is full or if the reserved space or the regular space within which the particular bucket resides is full, 1204 proceeds to 1208.

At 1206, since the particular bucket associated with the metadata change is not full and since the reserved space or the regular space within which the particular bucket resides is not full, the active tablet has capacity to ingest the metadata change. Accordingly, the specialized circuitry directs ingestion of the metadata change within the active tablet.

Alternatively, at 1208, if the particular bucket associated with the metadata change is full or if the reserved space or the regular space within which the particular bucket resides is full, the active tablet does not have capacity to ingest the metadata change. In this situation, the specialized circuitry determines whether the active tablet is full. If the active tablet is full, 1208 proceeds to 1210. However, if the active tablet is not full, 1208 proceeds to 1212.

At 1210, since the active tablet is full, the specialized circuitry performs a switch operation that switches designations of the tablets. In particular, in response to the switch operation, the earlier active tablet is now designated the new destaging tablet, and the earlier destaging tablet is now designated as the new active tablet (also see the arrow 1110(1) in FIG. 11).

However, at 1212, since the active tablet is not yet full, the specialized circuitry directs ingestion of the metadata change within the reserved space of the destaging tablet. In accordance with certain embodiments, the specialized circuitry confirms that the lower-indexed bucket associated with the reserved space are destaged by checking whether an IsDestaged flag is set to TRUE. If the IsDestaged flag is set to FALSE, the specialized circuitry waits. Otherwise, if the IsDestaged flag is set to TRUE, the specialized circuitry ingests the metadata change to the reserved space of the destaging tablet thus providing burst tolerance.

Figure 13:
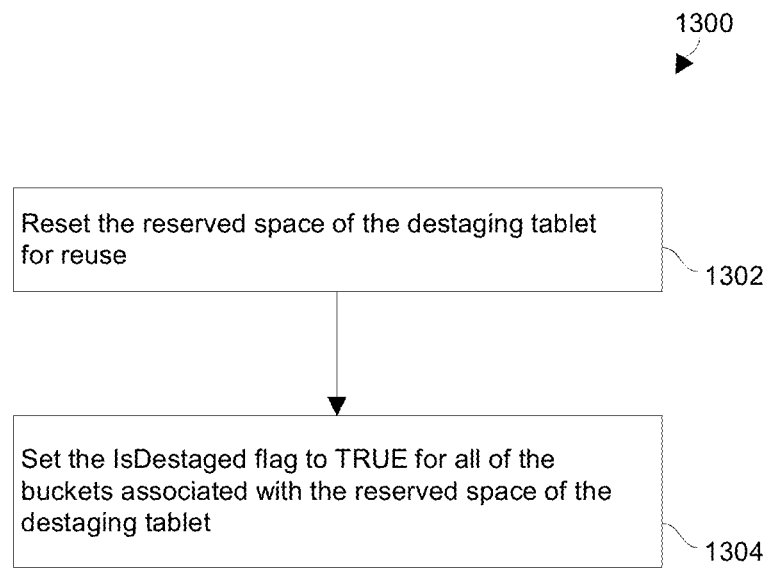

FIG. 13 shows a flow 1300 for certain operations performed by specialized circuitry on the destaging tablet. As mentioned earlier, the control circuitry 1020 (FIG. 10) is suitable for the specialized circuitry.

In particular, at 1302, when the destaging tablet is finished destaging the buckets associated with the reserved space, the specialized circuitry resets the reserved space for re-use. To this end, the specialized circuitry moves the reserved space pointer back to the start (or 0) (also see FIG. 10).

At 1304, the specialized circuitry sets the IsDestaged flag to TRUE for all of the buckets associated with the reserved space of the destaging tablet. Accordingly, the reserved space is of the destaging tablet is now ready for ingesting metadata changes.

Figure 14:
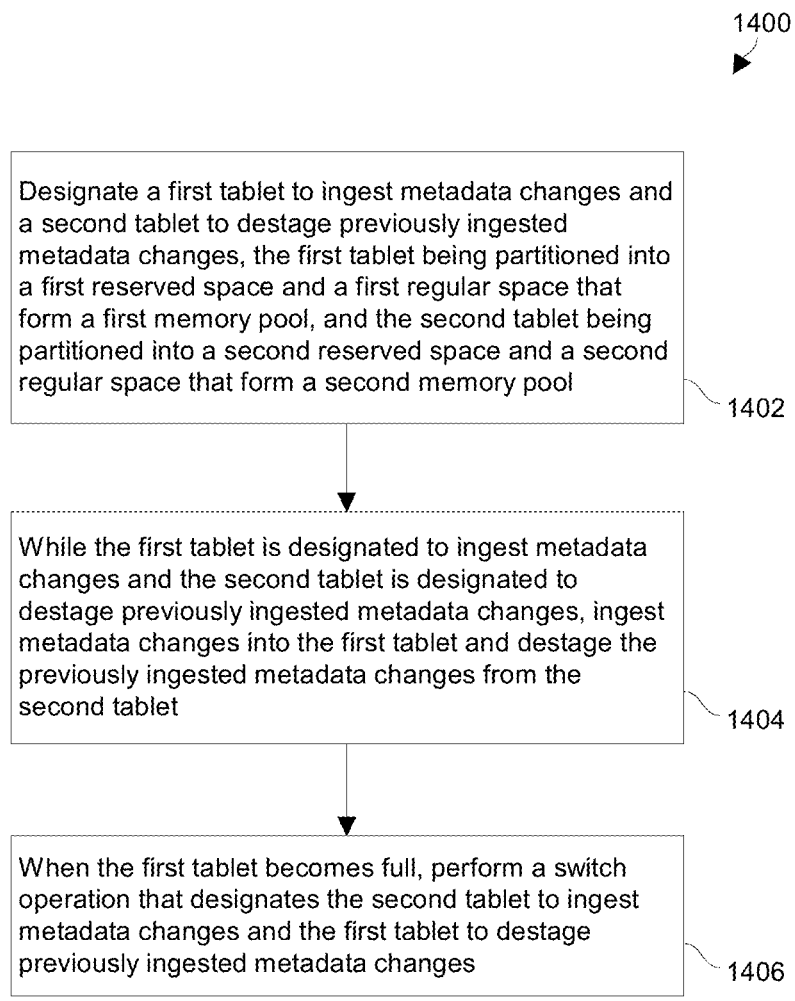

FIG. 14 shows a flowchart of a procedure 1400 which is performed by specialized circuitry to process metadata changes. Such a procedure 1400 provides performance smoothness and tolerance to bursts.

At 1402, the specialized circuitry designates a first tablet to ingest metadata changes and a second tablet to destage previously ingested metadata changes. The first tablet is partitioned into a first reserved space and a first regular space that form a first memory pool. Additionally, the second tablet is partitioned into a second reserved space and a second regular space that form a second memory pool.

At 1404, while the first tablet is designated to ingest metadata changes and the second tablet is designated to destage previously ingested metadata changes, the specialized circuitry ingests metadata changes into the first tablet and destages the previously ingested metadata changes from the second tablet. If there is a burst of metadata changes just prior to the active tablet becoming full, the second reserved space of the second tablet provides additional capacity for ingesting the burst.

At 1406, when the first tablet becomes full, the specialized circuitry performs a switch operation that designates the second tablet to ingest metadata changes and the first tablet to destage previously ingested metadata changes. That is, the switch operation involves switching roles of ingesting and destaging among the tablets.

Since the second reserved space of the second tablet provides additional capacity for ingesting bursts, the procedure 1400 provides tolerance to bursts. Accordingly, memory conservation, performance smoothness and burst tolerance are achieved.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope, of the disclosure defined in the appended claims.

Further Details

As described above, improved techniques are directed to processing metadata changes using tablets 1010 that are partitioned to provide reserved space 1030 and regular space 1040. The tablets 1010 form at least a portion of a metadata log for aggregating metadata changes. Along these lines, previously ingested metadata changes may be destaged from the reserved space 1030 of the current destaging tablet 1010 ahead of the regular space 1040. Accordingly, if the current active tablet 1010 is close to becoming full and a burst occurs, the reserved space 1030 of the current destaging tablet 1010 may be used for ingesting some or all of the burst since the reserve space of the current destaging tablet 1010 would be emptied first and would thus be available. By reusing the reserved space 1030 of the current destaging tablet 1010 in this manner, the metadata log is tolerant for bursts but nevertheless allows for maintaining a smooth destaging pace, while not using extra memory.

Consider a storage cluster based on a metadata log (MDL) architecture as described above with reference to FIGS. 8 and 9. Any update of a metadata page in such an architecture may be represented by the corresponding LI:EI:T:V delta tuple, where:

"LI" is unique Logical Index of the metadata (MD) page
"EI" is reference to the specific entry (offset) inside the metadata page
"T" is type of the change (also defining size of a new data payload)
"V" is the new (changed) data fragment of the metadata page (its size being defined by "T").

All of the tuples are maintained in cluster memory and have an index for quick and efficient searching of changes related to any specific MD page LI.

The in-memory index is divided usually to two structures, one serving ingest and the other serving destaging. This situation may be referred to as 'double buffering' since this allows collection of deltas while destaging previously collected ones.

Since both operations (ingest and destage) occur in parallel, there is an opportunity to cope with two contradicting objectives:

Objective 1—Performance Smoothness:
The destaging operation should not operate excessively to maintain resources (CPU, memory, bandwidth of drives) for ingest, but instead achieve constant and reasonable latency and IOPS/bandwidth Objective 2—Tolerance to Bursts
The ingest load to the MDL may vary in the face of pursuing performance smoothness, so destaging at roughly the same pace as while ingesting in parallel makes it difficult to accommodate ingest bursts as the active tablet further fills up (i.e., the reserve/remaining capacity is diminishing).

One approach to address both objectives is to destage a bit faster than the ingest pace. However such an approach does not enable achieving optimal performance since destaging faster means resources (CPU, memory, drives bandwidth, etc.) are taken for the ingest processing.

Another approach is to use triple buffering to handle the problem. However, memory is wasted to maintain a reserved space thus degrading the ability of the MDL to improve write amortization.

In accordance with certain embodiments, an improved technique is directed to memory conservation while maintaining smooth MDL destaging and burst tolerance. Such an improved technique borrows memory from the destaging tablet when available to accommodate bursts. The operation of the MDL includes checks and balances to ensure proper processing of metadata deltas and does not require consumption of additional memory resources.

In accordance with certain embodiments, an arbitrary reserved space is maintained on each tablet's memory pool. Note that the memory pool is contiguous and may be managed as a simple ring buffer (ingest moves the head, while the pool is reset entirely when destage ends).

Here, an IsDestaged flag per bucket indicates whether it is destaged or not. Note this flag doesn't reside on the reserved pool's memory space but on the regular pool.

Additionally, an additional head pointer is maintained for the reserved space. That is, one head pointer is used to indicate fullness within the tablet, and another head pointer (e.g., a reserved space head pointer) is used to indicate fullness of the reserved space within the tablet.

With these improvements in mind, the reserved space is used in two different ways:

1. The tablet owning the reserved space (the tablet who's memory is reserved) will ingest metadata deltas to the reserved space only for lower-index buckets. Specifically, those buckets are in the range of [0 . . . reserved_space_percentage*memory_pool_size/number_of_buckets]. Note that uniform distribution of deltas between buckets in HBSB is assumed since the bucket is simply an aggregate of hashed Us.
2. The other tablet (while it is active) uses that reserved space if the reserved space or the regular space of that other tablet is full to prevent a hiccup. If so, it could ingest to that space from whichever bucket.

It should be appreciated that, since destaging is sequentially processing buckets starting from index 0, the reserved space is released first as destaging progresses through the destaging tablet. Accordingly, the reserved space is available for ingesting.

In accordance with certain embodiments, ingesting new deltas to the current active tablet involves:

1. If bucket associated with ingested delta is on the lower-index range and reserved pool of this tablet is not full
   Ingest to reserved pool memory space
2. Else if tablet is not full
   Ingest to regular pool memory space
3. Else
   a. If DestagingTablet's reserved pool is not full (this is practically guaranteed) and lower-index buckets associated with the reserved pool are destaged (Bucket.IsDestaged is true).
      i. Ingest to the reserved pool of the DestagingTablet
   b. Else
      i. Wait until the DestagingTablet's reserved space is destaged (unlikely to happen)

In accordance with certain embodiments, destaging previously ingested deltas from the current destaging tablet involves:

When the destaging tablet is finished destaging the buckets associated with the reserved space, the following occurs:
a. The reserved space for re-use by ingest is reset by moving the reserved space head pointer back to the start (or 0).
b. The IsDestaged flag is set to TRUE (e.g., mark Bucket.IsDestaged=true) for all the buckets associated with the reserved space. Note that only from this point the reserved space for this tablet is re-used by the active tablet.

In accordance with certain embodiments, tablet switching involves:

1. Switching roles of the current active tablet and the current destaging tablet.
2. Upon switching, the new current active tablet starts ingesting from its regular pool.
3. Upon switching, the new current destaging tablet could have deltas residing on the new current active tablets reserved pool
   a. In that case, the new current destaging tablet (or the control circuitry operating on the new current destaging tablet) resets both the previously reserved space and its own upon destage completion of all its buckets Hence, by reusing the reserved space, the MDL is tolerant to bursts and allows for a smooth destaging and ingest pace, while not using extra memory.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the storage system 12 and/or the surrounding componentry, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One embodiment is directed to a method of processing metadata changes. The method includes designating a first tablet to ingest metadata changes and a second tablet to destage previously ingested metadata changes, the first tablet being partitioned into a first reserved space and a first regular space that form a first memory pool, and the second tablet being partitioned into a second reserved space and a second regular space that form a second memory pool. The method further includes, while the first tablet is designated to ingest metadata changes and the second tablet is designated to destage previously ingested metadata changes, ingesting metadata changes into the first tablet and destaging the previously ingested metadata changes from the second tablet. The method further includes, when the first tablet becomes full, performing a switch operation that designates the second tablet to ingest metadata changes and the first tablet to destage previously ingested metadata changes.

Another embodiment is directed to electronic equipment which includes memory and control circuitry coupled with the memory. The memory stores instructions which, when carried out by the control circuitry, cause the control circuitry to perform a method of processing metadata changes which includes:

(A) designating a first tablet to ingest metadata changes and a second tablet to destage previously ingested metadata changes, the first tablet being partitioned into a first reserved space and a first regular space that form a first memory pool, and the second tablet being partitioned into a second reserved space and a second regular space that form a second memory pool;

(B) while the first tablet is designated to ingest metadata changes and the second tablet is designated to destage previously ingested metadata changes, ingesting metadata changes into the first tablet and destaging the previously ingested metadata changes from the second tablet; and (C) when the first tablet becomes full, performing a switch operation that designates the second tablet to ingest metadata changes and the first tablet to destage previously ingested metadata changes.

Yet another embodiment is directed to a computer program product having a non-transitory computer readable medium which stores a set of instructions to process metadata changes. The set of instructions, when carried out by computerized circuitry, causing the computerized circuitry to perform a method of:

(A) designating a first tablet to ingest metadata changes and a second tablet to destage previously ingested metadata changes, the first tablet being partitioned into a first reserved space and a first regular space that form a first memory pool, and the second tablet being partitioned into a second reserved space and a second regular space that form a second memory pool;

(B) while the first tablet is designated to ingest metadata changes and the second tablet is designated to destage previously ingested metadata changes, ingesting metadata changes into the first tablet and destaging the previously ingested metadata changes from the second tablet; and (C) when the first tablet becomes full, performing a switch operation that designates the second tablet to ingest metadata changes and the first tablet to destage previously ingested metadata changes.

In some arrangements, the method further includes configuring the first reserved space of the first memory pool to hold metadata changes having low indexes that fall within a low index range and the first regular space of the first memory pool to hold metadata changes having high indexes that fall within a high index range that is higher than the low index range.

In some arrangements, the first memory pool is contiguous. Additionally, configuring includes partitioning the first memory pool into the first reserved space and the first regular space using a first threshold.

In some arrangements, ingesting the metadata changes into the first tablet includes placing metadata changes having indexes that are lower than the first threshold into the first reserved space and metadata changes having indexes that are higher than the first threshold into the first regular space.

In some arrangements, the metadata changes include changes to metadata pages. Additionally, ingesting the metadata changes into the first tablet includes, prior to placing, generating hash values of addresses to the metadata pages as the indexes of the metadata changes.

In some arrangements, the method further includes, while the first tablet is designated to ingest metadata changes and the second tablet is designated to destage previously ingested metadata changes and prior to the first tablet becoming full, ingesting a metadata change into the second tablet.

In some arrangements, the metadata change targets one of the first reserved space and the first regular space of the first tablet. Additionally, ingesting the metadata change into the second tablet includes placing the metadata change into the second reserved space of the second table in response to the one of the first reserved space and the first regular space of the first tablet being full.

In some arrangements, the method further includes, after performing the switch operation and while the second tablet is designated to ingest metadata changes and the first tablet is designated to destage previously ingested metadata changes, destaging all metadata changes in the second reserved space of the second tablet.

In some arrangements, the first reserved space uses a reserved space pointer to identify next available space within the first reserved space. Additionally, the method further includes, while the first tablet is designated to ingest metadata changes and the second tablet is designated to destage previously ingested metadata changes and prior to the first tablet becoming full, detecting that the first reserved space has become full based on a value of the reserved space pointer.

In some arrangements, the method further includes, after placing the metadata change into the second reserved space of the second table and prior to the first tablet becoming full, ingesting another metadata change into the first tablet.

In some arrangements, the other metadata change targets the other of the first reserved space and the first regular space of the first tablet. Additionally, ingesting the other metadata change into the first tablet includes placing the other metadata change into the other of the first reserved space and the first regular space of the first tablet in response to the other of the first reserved space and the first regular space of the first tablet not being full.

In some arrangements, the second reserved space of the second tablet includes buckets corresponding to respective metadata pages. Additionally, the metadata change targets a bucket corresponding a particular metadata page. Furthermore, placing the metadata change into the second reserved space includes testing an IsDestaged flag for the bucket corresponding a particular metadata page, and placing the metadata change into the bucket in response to the IsDestaged flag being set to TRUE.

In some arrangements, after the switch operation, the IsDestaged flag for the bucket corresponding the particular metadata page is set to FALSE. Additionally, the method further includes, after performing the switch operation, destaging all metadata changes from the bucket and re-setting the IsDestaged flag to TRUE.

In some arrangements, the first tablet and the second tablet form a portion of a log structured merge tree of a data storage system. Additionally, the method further includes writing host data into and reading host data from a set of storage devices of the data storage system while the log structured merge tree aggregates metadata associated with the host data.

In some arrangements, the metadata changes include tuples. Each tuple has:
a logical index that uniquely identifies a metadata page within the data storage system
an offset that identifies a particular entry within the metadata page,
a type that specifies a type of metadata change, and
a payload specifying a new metadata fragment for the metadata page.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of processing metadata changes, the method comprising:
designating a first tablet to ingest metadata changes and a second tablet to destage previously ingested metadata changes, the first tablet being partitioned into a first reserved space and a first regular space that form a first memory pool, and the second tablet being partitioned into a second reserved space and a second regular space that form a second memory pool;
while the first tablet is designated to ingest metadata changes and the second tablet is designated to destage previously ingested metadata changes, ingesting metadata changes into the first tablet and destaging the previously ingested metadata changes from the second tablet;
prior to the first tablet becoming full, while the first tablet is designated to ingest metadata changes and the second tablet is designated to destage previously ingested metadata changes, ingesting a metadata change into the second tablet; and
when the first tablet becomes full, performing a switch operation that designates the second tablet to ingest metadata changes and the first tablet to destage previously ingested metadata changes;
wherein the metadata change targets one of the first reserved space and the first regular space of the first tablet; and
wherein ingesting the metadata change into the second tablet includes:
placing the metadata change into the second reserved space of the second tablet in response to the one of the first reserved space and the first regular space of the first tablet being full.

2. The method of claim 1, further comprising:
configuring the first reserved space of the first memory pool to hold metadata changes having low indexes that fall within a low index range and the first regular space of the first memory pool to hold metadata changes having high indexes that fall within a high index range that is higher than the low index range.

3. The method of claim 2 wherein the first memory pool is contiguous; and
wherein configuring includes:
partitioning the first memory pool into the first reserved space and the first regular space using a threshold.

4. The method of claim 3 wherein ingesting the metadata changes into the first tablet includes:
placing metadata changes having indexes that are lower than the threshold into the first reserved space and metadata changes having indexes that are higher than the threshold into the first regular space.

5. The method of claim 4 wherein the metadata changes include changes to metadata pages; and
wherein ingesting the metadata changes into the first tablet includes:
prior to placing the metadata changes, generating hash values of addresses to the metadata pages as the indexes of the metadata changes.

6. The method of claim 1, further comprising:
after performing the switch operation and while the second tablet is designated to ingest metadata changes and the first tablet is designated to destage previously ingested metadata changes, destaging all metadata changes in the second reserved space of the second tablet.

7. The method of claim 6 wherein the first reserved space uses a reserved space pointer to identify a next available space within the first reserved space;
wherein the method further comprises:
while the first tablet is designated to ingest metadata changes and the second tablet is designated to destage previously ingested metadata changes and prior to the first tablet becoming full, detecting that the first reserved space has become full based on a value of the reserved space pointer.

8. The method of claim 1, further comprising:
after placing the metadata change into the second reserved space of the second tablet and prior to the first tablet becoming full, ingesting an other metadata change into the first tablet.

9. The method of claim 8 wherein the other metadata change targets the other of the first reserved space and the first regular space of the first tablet; and
wherein ingesting the other metadata change into the first tablet includes:
placing the other metadata change into the other of the first reserved space and the first regular space of the first tablet in response to the other of the first reserved space and the first regular space of the first tablet not being full.

10. The method of claim 1 wherein the second reserved space of the second tablet includes buckets corresponding to respective metadata pages; wherein the metadata change targets a bucket corresponding to a particular metadata page; and wherein placing the metadata change into the second reserved space includes: testing an IsDestaged flag for the bucket corresponding to a particular metadata page, and placing the metadata change into the bucket in response to the IsDestaged flag being set to TRUE.

11. The method of claim 10 wherein after the switch operation, the IsDestaged flag for the bucket corresponding to the particular metadata page is set to FALSE; and wherein the method further comprises: after performing the switch operation, destaging all metadata changes from the bucket and re-setting the IsDestaged flag to TRUE.

12. The method of claim 1 wherein the first tablet and the second tablet form a portion of a log structured merge tree of a data storage system; and
wherein the method further comprises:
writing host data into and reading host data from a set of storage devices of the data storage system while the log structured merge tree aggregates metadata associated with the host data.

13. The method of claim 12 wherein the metadata changes include tuples, each tuple having:
a logical index that uniquely identifies a metadata page within the data storage system
an offset that identifies a particular entry within the metadata page,
a type that specifies a type of metadata change, and
a payload specifying a new metadata fragment for the metadata page.

14. The method of claim 12 wherein ingesting the metadata changes into the first tablet and destaging the previously ingested metadata changes from the second tablet includes:
performing ingest operations on the first tablet and destaging operations on the second tablet in parallel.

15. Electronic equipment, comprising:
memory; and
control circuitry coupled to the memory, the memory storing instructions which, when carried out by the control circuitry, cause the control circuitry to perform a method of processing metadata changes which includes:
designating a first tablet to ingest metadata changes and a second tablet to destage previously ingested metadata changes, the first tablet being partitioned into a first reserved space and a first regular space that form a first memory pool, and the second tablet being partitioned into a second reserved space and a second regular space that form a second memory pool;
while the first tablet is designated to ingest metadata changes and the second tablet is designated to destage previously ingested metadata changes, ingesting metadata changes into the first tablet and destaging the previously ingested metadata changes from the second tablet;
prior to the first tablet becoming full, while the first tablet is designated to ingest metadata changes and the second tablet is designated to destage previously ingested metadata changes, ingesting a metadata change into the second tablet; and
when the first tablet becomes full, performing a switch operation that designates the second tablet to ingest metadata changes and the first tablet to destage previously ingested metadata changes;
wherein the metadata change targets one of the first reserved space and the first regular space of the first tablet; and
wherein ingesting the metadata change into the second tablet includes:
placing the metadata change into the second reserved space of the second tablet in response to the one of the first reserved space and the first regular space of the first tablet being full.

16. The electronic equipment as in claim 15 wherein the method further includes:
configuring the first reserved space of the first memory pool to hold metadata changes having low indexes that fall within a low index range and the first regular space of the first memory pool to hold metadata changes having high indexes that fall within a high index range that is higher than the low index range.

17. The electronic equipment as in claim 16 wherein the first memory pool is contiguous; and
wherein configuring includes:
partitioning the first memory pool into the first reserved space and the first regular space using a threshold.

18. The electronic equipment as in claim 15 wherein ingesting the metadata changes into the first tablet and destaging the previously ingested metadata changes from the second tablet includes:
performing ingest operations on the first tablet and destaging operations on the second tablet in parallel.

19. A computer program product having a non-transitory computer readable medium which stores a set of instructions to process metadata changes; the set of instructions, when carried out by computerized circuitry, causing the computerized circuitry to perform a method of:
designating a first tablet to ingest metadata changes and a second tablet to destage previously ingested metadata changes, the first tablet being partitioned into a first reserved space and a first regular space that form a first memory pool, and the second tablet being partitioned into a second reserved space and a second regular space that form a second memory pool;
while the first tablet is designated to ingest metadata changes and the second tablet is designated to destage previously ingested metadata changes, ingesting metadata changes into the first tablet and destaging the previously ingested metadata changes from the second tablet;
prior to the first tablet becoming full, while the first tablet is designated to ingest metadata changes and the second tablet is designated to destage previously ingested metadata changes, ingesting a metadata change into the second tablet; and when the first tablet becomes full, performing a switch operation that designates the second tablet to ingest metadata changes and the first tablet to destage previously ingested metadata changes;

wherein the metadata change targets one of the first reserved space and the first regular space of the first tablet; and wherein ingesting the metadata change into the second tablet includes:
 placing the metadata change into the second reserved space of the second tablet in response to the one of the first reserved space and the first regular space of the first tablet being full.

20. The computer program product of claim 19 wherein ingesting the metadata changes into the first tablet and destaging the previously ingested metadata changes from the second tablet includes:
 performing ingest operations on the first tablet and destaging operations on the second tablet in parallel.

* * * * *